(12) United States Patent
Konishi

(10) Patent No.: US 8,068,059 B2
(45) Date of Patent: Nov. 29, 2011

(54) ANTENNA DEVICE, ELECTRONIC DEVICE AND ANTENNA COVER

(75) Inventor: Michihiro Konishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 242 days.

(21) Appl. No.: 12/230,395

(22) Filed: Aug. 28, 2008

(65) Prior Publication Data

US 2009/0058739 A1    Mar. 5, 2009

Related U.S. Application Data

(63) Continuation of application No. PCT/JP2007/053762, filed on Feb. 28, 2007.

(30) Foreign Application Priority Data

Feb. 28, 2006 (JP) ................................ 2006-052471

(51) Int. Cl.
    *H01Q 1/24*      (2006.01)
    *H01Q 1/42*      (2006.01)

(52) U.S. Cl. ................ 343/702; 343/872; 343/911 R

(58) Field of Classification Search ................. None
See application file for complete search history.

(56) References Cited

U.S. PATENT DOCUMENTS

| | | | | |
|---|---|---|---|---|
| 4,148,039 A | * | 4/1979 | Lunden | 343/872 |
| 4,179,699 A | * | 12/1979 | Lunden | 343/872 |
| 5,173,699 A | * | 12/1992 | Barr et al. | 342/2 |
| 6,342,860 B1 | * | 1/2002 | Haussler et al. | 343/702 |
| 6,879,293 B2 | * | 4/2005 | Sato | 343/702 |
| 7,242,353 B2 | * | 7/2007 | Hung et al. | 343/702 |
| 2008/0291095 A1 | * | 11/2008 | Krishtul | 343/702 |

FOREIGN PATENT DOCUMENTS

| | | | |
|---|---|---|---|
| JP | 03-010407 | | 1/1991 |
| JP | 3-10407 | | 1/1991 |
| JP | 3010407 | * | 1/1991 |
| JP | 11-122022 | | 4/1999 |
| JP | 2001-244716 | | 9/2001 |
| JP | 2003-218630 | | 7/2003 |
| JP | 2004-015408 | | 1/2004 |
| JP | 2004-56276 | * | 2/2004 |
| JP | 2004-118666 | | 4/2004 |

OTHER PUBLICATIONS

Translation of the International Preliminary Report on Patentability dated Sep. 18, 2008, issued in corresponding International Application No. PCT/JP2007/053762.

* cited by examiner

*Primary Examiner* — Trinh Dinh
(74) *Attorney, Agent, or Firm* — Fujitsu Patent Center

(57) ABSTRACT

An antenna device is mounted in a note PC and is used for communication between the note PC and the external of the note PC. The antenna device is provided with an antenna for wireless LAN for transmitting and receiving radio waves, and a cover. The cover is formed of a dielectric material for covering the antenna with a wall and a ceiling, and strengthens the directivity of radio wave communication on the wall side of the antenna device by a double layer structure of the ceiling that is thicker than the wall.

10 Claims, 34 Drawing Sheets

ANTENNA DEVICE, ELECTRONIC DEVICE AND ANTENNA COVER

This is a continuing application, filed under 35 U.S.C. §111(a), of International Application PCT/JP2007/053762, filed Feb. 28, 2007, it being further noted that foreign priority benefit is based upon Japanese Patent Application No. 2006-052471, filed Feb. 28, 2006.

TECHNICAL FIELD

The present invention relates to an antenna device used for radio wave communication, an electronic device mounted with such an antenna device and an antenna cover used for such an antenna device.

BACKGROUND ART

A technique for building a so-called LAN (Local Area Network) by connecting multiple computers one another with cables has become widespread in offices or the like. Here, in the technique for building a LAN with cables, there are such problems that a construction of cable installation often takes time and cost and in some places or a LAN cannot be built due to the difficulty of cable installation or the like. Furthermore, in recent years, a notebook type personal computer (note PC) convenient for carrying around is often used, yet if the note PC is incorporated into a LAN built with cables, there is a problem that the convenience of portability of the note PC is impaired or the like.

Therefore, recently, there is an increasing demand for a so-called wireless LAN that is built by connecting multiple computers one another via wireless communication.

In the wireless LAN, there are a type that conducts communication via a relay device called as an access point and a type that conducts communication directly between computers without routing any access point. In each type, it is necessary for each computer to mount an antenna device for radio wave communication. Here, it is often the case where wireless communication in this wireless LAN takes place in a space extending in horizontal direction such as within a room or in between rooms adjacent to each other. Therefore, it is desirable for a wireless LAN antenna device used for such a wireless LAN to have stronger directivity in horizontal direction than in vertical direction.

Traditionally, as a technique of obtaining a desired directivity for an antenna device, for example, there have been proposed a technique that designs the shape of an antenna that constitutes an antenna device depending on a desired directivity (See Japanese Patent Application Publication No. Hei 11-122022, for example); or a technique that constitutes an antenna device with an antenna and a passive terminal that has a function of changing a directivity of the antenna and disposes the passive terminal in a position in accordance with a desired directivity. Also, as a technique of obtaining a desired receiving property and a desired transmitting property in an antenna device, for example, there have been proposed a technique that puts a contrivance to the shape of an antenna cover so that the receiving property through the cover toward radio waves coming from above can become a desirable property (See Japanese Patent Application Publication No. 2001-244716, for example); or there have been proposed a technique that puts a contrivance to the shape of an antenna cover in order to make the transmitting property through the cover toward radio waves going upward a desirable property (See Japanese Patent Application Publication No. 2004-15408, for example).

DISCLOSURE OF THE INVENTION

Here, in the techniques shown in the above-described Patent Application Publication Nos. 2001-244716 and 2004-15408, a cover wrapping the antenna needs to have sufficient thickness and area relative to a wavelength transmitted and received by the antenna. However, a space for the installation is limited in most antenna devices mounted in a portable device, for example, such as a wireless LAN antenna device or the like that is mounted in a note PC. Therefore, it is difficult to provide enough thickness and area capable of obtaining a desired directivity for the cover wrapping the antenna, by applying the techniques shown in the Patent Application Publication Nos. 2001-244716 and 2004-15408.

Accordingly, although in theory it is possible to design the shape of an antenna constituting an antenna device in such a manner that a strong directivity can be obtained in the horizontal direction through the application of the technique of Application Publication No. 2004-15408, since various kinds of factors other than directivity, such as the efficiency of radio wave communication or the like are involved in designing the shape of an antenna, skills are required to design the best-suited shape by taking all these factors into consideration. Moreover, according to the technique that uses the above-described passive terminal, although a desired directivity pattern can be obtained by determining the best-suited placement of the passive terminal through trial and error or the like, for example, it is still difficult to apply the technique to an antenna device mounted in portable devices in terms of the space for installation, as is the case with the techniques shown in the aforementioned Patent Application Publication Nos. 2001-244716 and 2004-15408.

The present invention has been made in view of the above circumstances and aims to provide an antenna device capable of obtaining a strong directivity toward the horizontal direction easily while suppressing increase in installation space, an electronic device capable of transmitting and receiving information well toward the horizontal direction using such an antenna device and an antenna cover used for such an antenna device.

To achieve the aforementioned objective, an antenna device according to the present invention is an antenna device that is mounted in an electronic device and used for radio wave communication between the electronic device and the external of the electronic device, the antenna device having an antenna main body and an antenna cover that is formed of a dielectric material, has a wall and a ceiling for covering the antenna main body and strengthens directivity of radio wave communication on the wall side of the antenna device by a structure of the ceiling.

Conventionally, it has been considered that when an antenna is wrapped in a cover of dielectric material, the cover has little effect on directivity of radio waves if the thickness of the cover is thin enough and also the area of the cover is narrow enough for the wavelength of radio waves. However, by an experiment to be described later, which has been conducted by the present inventor in relation to the present invention, it has been found that when an antenna is wrapped in such a thin narrow cover, radio waves passing through the cover are diffused, and further, such a diffusion effect is dependent on the structure of the cover. The present invention has been made based on such an experiment result, and with an antenna device according to the present invention. The present invention makes it possible to strengthen directivity on the side of a wall, for example, by making the structure of the ceiling have more enhanced diffusion effect on radio waves than the wall has to diffuse more radio waves on the side of the wall. Consequently, by an easy operation, for example, mounting the antenna device according to the present invention in the electronic device such that the wall of the antenna device faces in the horizontal direction, a strong directivity can be obtained in the horizontal direction. Furthermore, according to the antenna device of the present invention, mounting of the antenna device requires simple operation only, for example, replacing a part of an enclosure of the electronic device with the antenna cover. Thus, no special additional space is required for mounting. In short, according to the antenna device in the present invention, it is possible to obtain a desirable directivity with easy operation while suppressing the increase in installation space.

Here, in the antenna device according to the present invention, it is a favorable embodiment that "the ceiling of the antenna cover is thicker than the wall."

In the aforementioned experiment, it has been found that the thicker a cover becomes, the stronger the diffusion effect appears on radio waves by a dielectric cover wrapping the antenna. According to the antenna device in the above-described favorable embodiment, since the thickness of the ceiling is thicker than the wall and radio waves are diffused more on the side of the wall, directivity on the side of the wall is enhanced.

Moreover, in the antenna device according to the present invention, it is also a favorable embodiment that "the ceiling of the antenna cover is formed by stacking plural ceiling boards."

In the aforementioned experiment, it has been also found that the diffusion effect on radio waves by a dielectric cover wrapping the antenna strongly appears if multiple covers are stacked. According to the antenna device in the above-described favorable embodiment, since the ceiling has a structure in which multiple ceiling boards are piled and radio waves are diffused more on the side of the wall, directivity on the side of the wall is enhanced.

Further, in the antenna device according to the present invention, it is also a favorable embodiment that "the ceiling of the antenna cover has sawtooth-shape convexo-concaves formed on the side of the antenna main body as the ceiling."

According to the antenna device in this favorable embodiment, since radio waves are diffused more on the side of the wall by the reflection, refraction, diffraction or the like of the radio waves caused by the sawtooth convexo-concaves, directivity on the side of the wall is enhanced.

Furthermore, in the antenna device according to the present invention, it is also a favorable embodiment that "the ceiling of the antenna cover has square pyramid-shape convexo-concaves formed on the side of the antenna main body."

According to the antenna device in this favorable embodiment, since radio waves are diffused more on the side of the wall by the reflection, refraction, diffraction or the like of the radio waves caused by the square pyramid-shape convexo-concaves, directivity on the side of the wall is enhanced.

Additionally, the antenna device according to the present invention may be an embodiment that "the electronic device is portable".

By using the antenna device in such an embodiment as a wireless LAN antenna device, for example, portable electronic devices like a note PC and others can be incorporated into a wireless LAN.

Also, an electronic device according to the present invention to attain the above-described objective includes: an antenna device used for radio wave communication, which is equipped with an antenna main body and an antenna cover that is formed of a dielectric material, has a wall and a ceiling for covering the antenna main body, and strengthens directivity of radio wave communication on the wall side of the antenna device by a structure of the ceiling; a processor that conducts information processing; and a communication section that transmits and receives information as an object of information processing by the processor, to and from the external through radio wave communication of the antenna device.

According to the electronic device in the present invention, for example, by an easy operation, for example, by mounting the antenna device such that the wall faces in the horizontal direction, a strong directivity can be obtained in the horizontal direction. Thereby transmitting and receiving of information in the horizontal direction can be performed well.

Moreover, in the electronic device according to the present invention, an embodiment that "the ceiling of the antenna cover is thicker than the wall," an embodiment that "the ceiling of the antenna cover is formed by stacking plural ceiling boards," an embodiment that "the ceiling of the antenna cover has sawtooth-shape convexo-concaves formed on the side of the antenna main body," or an embodiment that "the ceiling of the antenna cover has square pyramid-shape convexo-concaves formed on the side of the antenna main body" are also favorable embodiments.

Also the electronic device according to the present invention may be either an embodiment that "the electronic device is portable" or "the electronic device is formed by a main body having a surface to mount the electronic device thereon and a top section that is connected to the main body so as to be openable and closable relative to the main body, and the top section incorporates the antenna device and the antenna cover."

In addition, an antenna cover according to the present invention to attain the above-described objective may be an antenna cover applicable for an electronic device equipped with an antenna device used for radio wave communication, the antenna cover being equipped with two walls formed of a dielectric material and a ceiling to both ends of which the two walls are connected respectively, wherein the antenna cover wraps an antenna main body of the antenna device with the two walls and the ceiling, and strengthens directivity of radio waves on the wall side of the antenna device by a structure of the ceiling.

According to the antenna cover in the present invention, it is possible to realize an antenna device capable of obtaining a strong directivity easily toward the horizontal direction with the restriction of increase in installation space and an electronic device capable of transmitting and receiving information well toward the horizontal direction.

Further, in the antenna cover according to the present invention, an embodiment that "the ceiling of the antenna cover is thicker than the wall", an embodiment that "the ceiling of the antenna cover is formed by stacking plural ceiling boards," an embodiment that "the ceiling of the antenna cover has sawtooth-shape convexo-concaves formed on the side of the antenna main body", or an embodiment that "the ceiling of the antenna cover has square pyramid-shape convexo-concaves formed on the side of the antenna main body" are also favorable embodiments.

Moreover, an antenna cover according to the present invention may be an embodiment that "the electronic device is portable."

As described above, according to the present invention, it is possible to provide an antenna device capable of obtaining a strong directivity easily toward the horizontal direction while suppressing the increase in installation space, an electronic device capable of transmitting and receiving information well toward the horizontal direction by using such an antenna device, and an antenna cover used for such an antenna device.

BEST MODE FOR CARRYING OUT THE INVENTION

The embodiments of the present invention will be described below with reference to the drawings.

Figure 1:
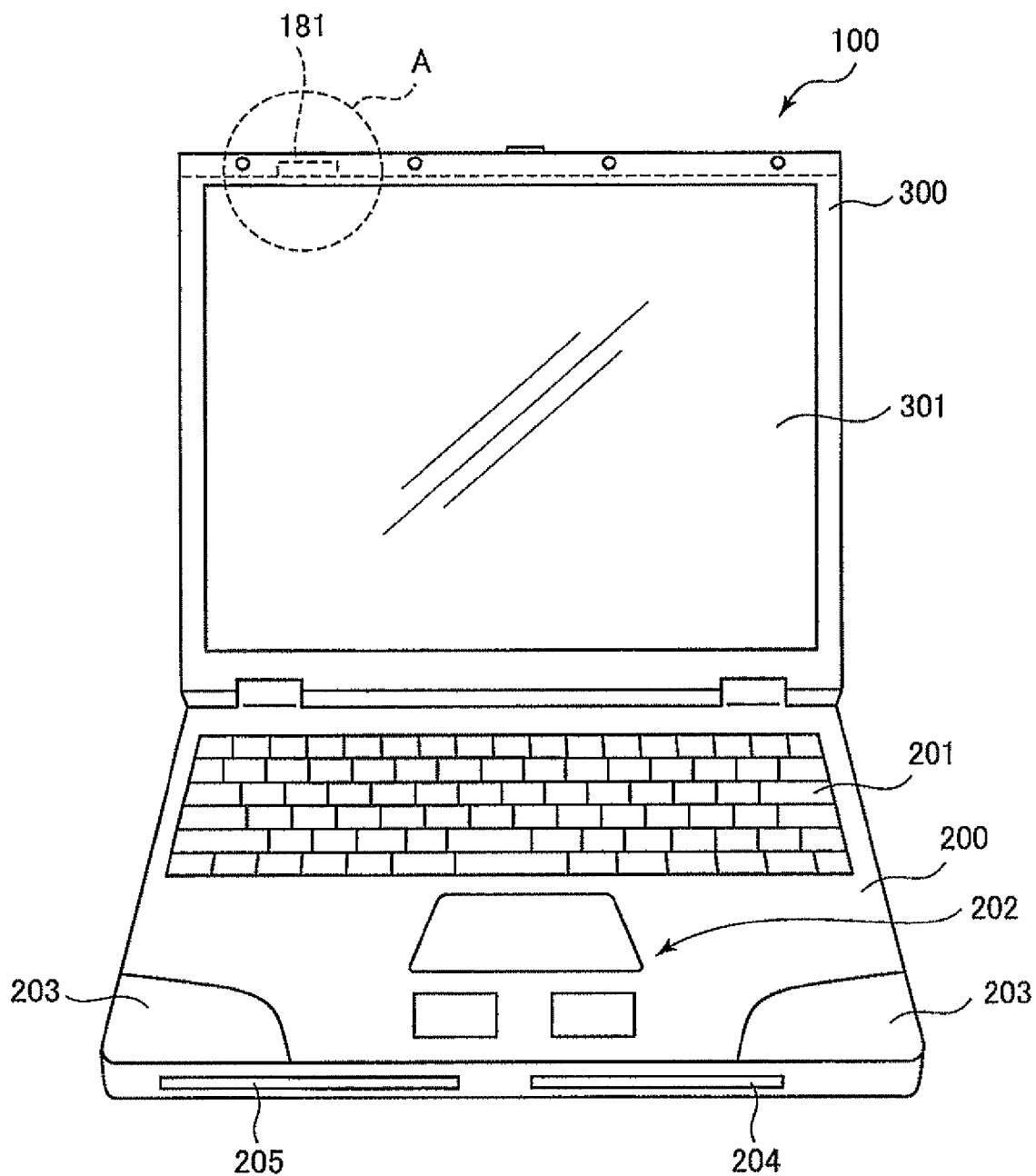
FIG. 1 is an external view of a notebook type personal computer (note PC) to which one embodiment of the antenna device according to the present invention is applied.
Figure 2:
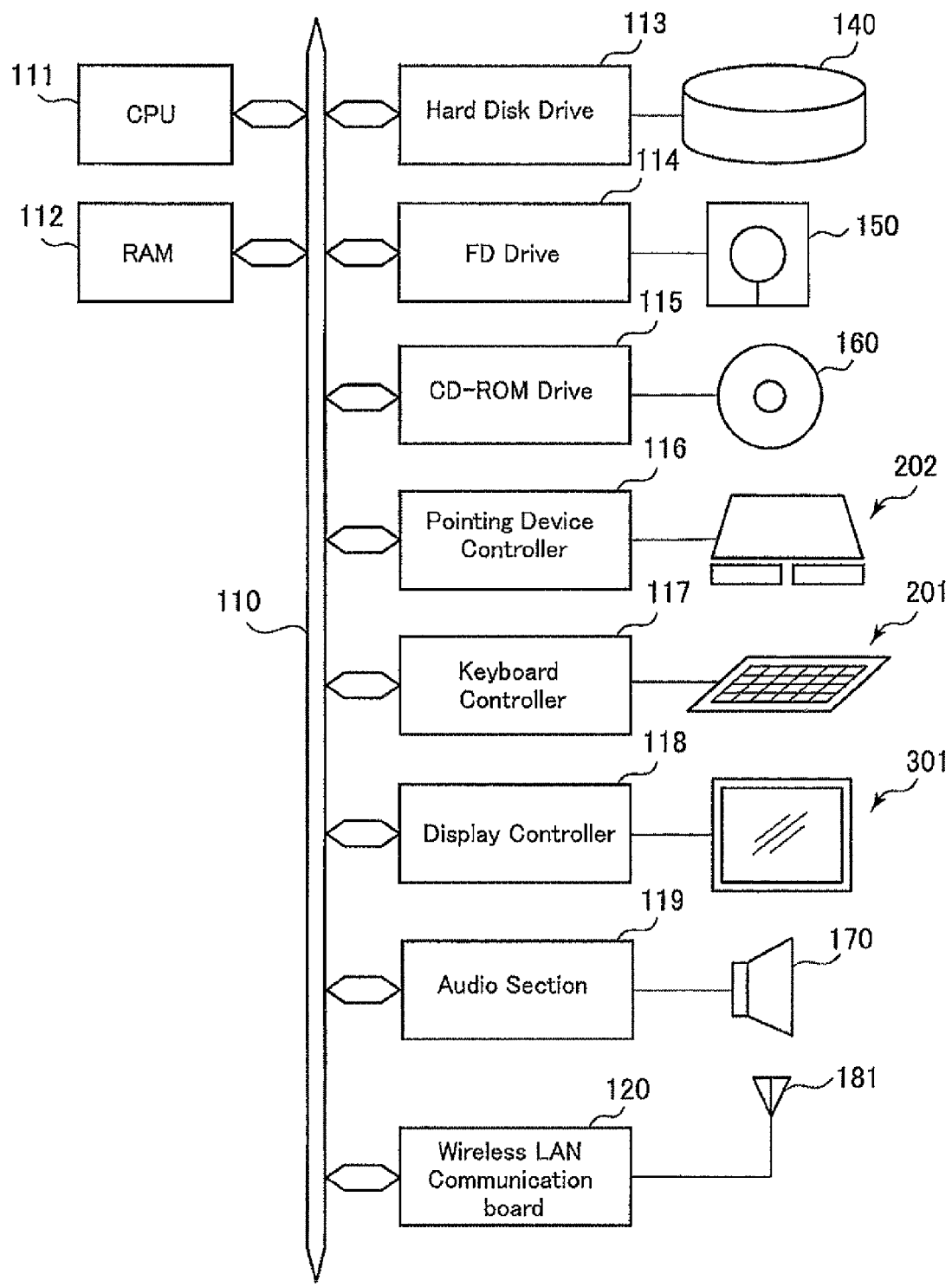
FIG. 2 is a diagram of a hardware configuration of the note PC.

FIG. 1 is a drawing of the outlook of a notebook type personal computer (note PC) as one embodiment of the present invention, and FIG. 2 is a drawing of a hardware configuration of the note PC.

Here, this note PC 100 corresponds to one embodiment of the electronic device according to the present invention.

This note PC 100 includes a main body 200 having an undersurface to mount the note PC 100 thereon, and a top section 300 that can be opened and closed freely relative to the main body 200. The top section 300 is closed when this note PC 100 is not used and opened when used.

FIG. 1 shows a state of this note PC 100 in use.

The main body 200 is equipped with a keyboard 201, a pointing device 202, a sound section 203 incorporating a speaker inside, a FD slot 204 through which a flexible disk (FD) is inserted, a CD-ROM slot 205 through which a CD-ROM or the like is inserted.

Also, an LCD display screen 301 is disposed on a surface of the top section 300 that faces inside when the top section is brought into a closed state. Moreover, a wireless LAN antenna 181 for incorporating this note PC 100 into wireless LAN is disposed at the end portion of the upper left side of the top section 300 when the top section is brought into an open state.

Furthermore, as shown in FIG. 2, this note PC 100 is equipped with a CPU 111 for executing various kinds of programs, a RAM 112 in which a program executed by the CPU 111 is expanded, a hard disk drive 113 for accessing a built-in hard disk 140, a FD drive 114 for accessing a FD 150 inserted from the FD slot 204 shown in FIG. 1, a CD-ROM drive 115 for accessing a CD-ROM 160 inserted from the CD-ROM slot 205 shown in FIG. 1, a pointing device controller 116 also shown in FIG. 1 for conveying operational information of the pointing device 202 to the CPU 111, a keyboard controller 117 for conveying operational information of the keyboard 201 to the CPU 111, a display controller 118 for controlling display screen on the LCD display screen 301 in response to a direction of the CPU 111, an audio section 119 for outputting sound from a speaker 170 placed in the sound section 203 and a wireless LAN communication board 120 for conducting wireless LAN communication via the wireless LAN antenna 181 that is also shown in FIG. 1, and these are connected to one another via a bus 110.

Here, the CPU 111 and the wireless LAN communication board 120 respectively correspond to one example of the processor and the communication section in the electronic device according to the present invention.

In most cases, wireless communication in the wireless LAN is conducted in a space that spreads in the horizontal direction, such as within a room and in between of rooms adjoining each other. Because of this, as in this note PC 100, it is preferable that a communication function in personal computers incorporated into the wireless LAN possesses directivity as strong as possible toward the horizontal direction.

In the present embodiment, such directivity in the communication function is realized by the structure of a peripheral portion A (See FIG. 1) of this wireless LAN antenna 181, including the wireless LAN antenna 181 built in this note PC 100. In the following, descriptions will be given about the structure of the peripheral portion A. Please note that in the following descriptions, the component elements shown in FIGS. 1 and 2 are referred to without designating reference numerals thereof.

Figure 3:
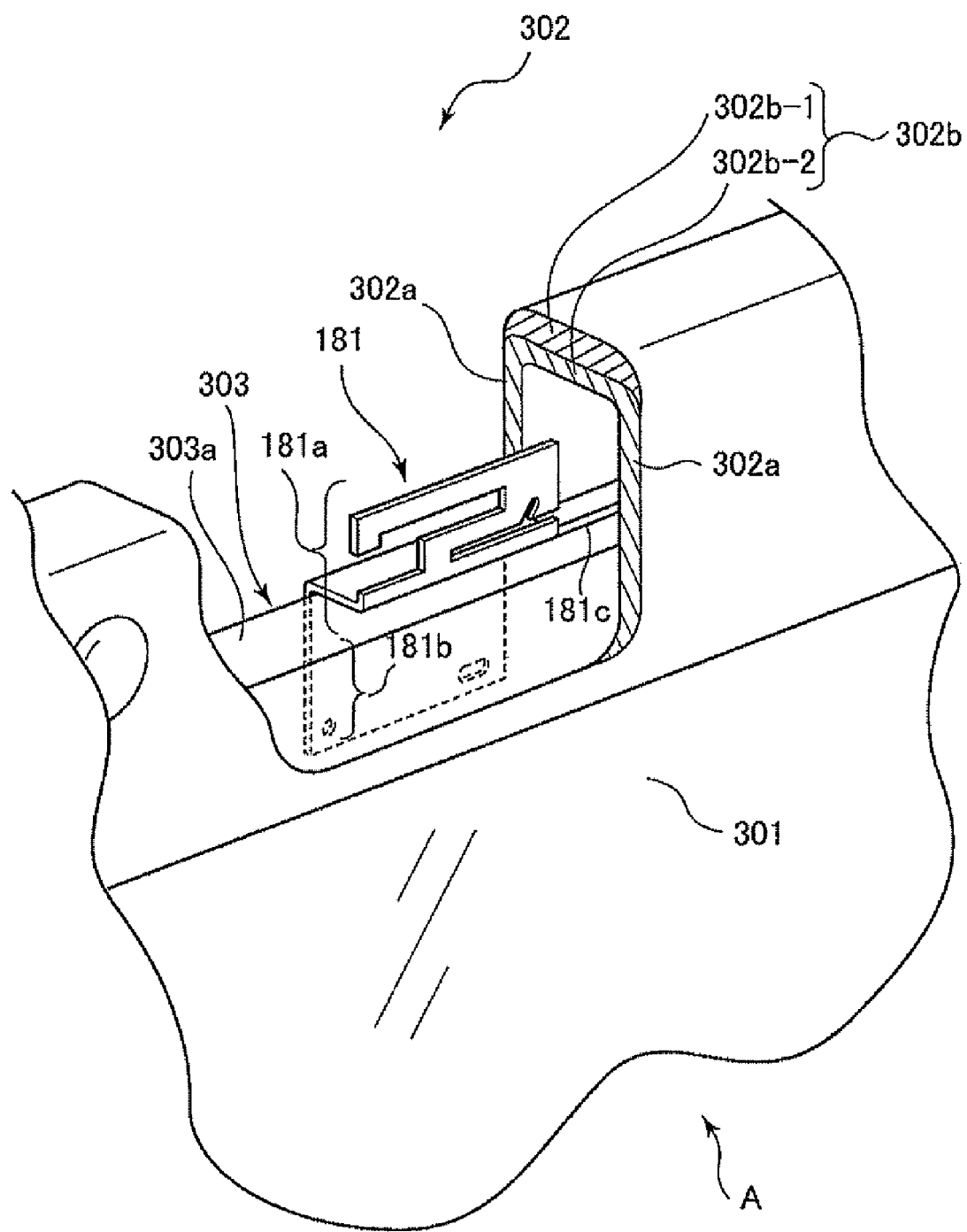
FIG. 3 is a diagram showing the structure of a peripheral portion A of a wireless LAN antenna 181.

FIG. 3 is a diagram showing the structure of the peripheral portion A of the wireless LAN antenna 181.

In this FIG. 3, the peripheral portion A is shown by partially removing a cover 302 of the top section 300 to reveal the wireless LAN antenna 181 incorporated in the top section 300.

The wireless LAN antenna 181 is integrally formed with a transmission-reception section 181a for transmitting and receiving radio waves, and constituted of a fixed section 181b that supports the transmission-reception section 181a and that is fixed to other parts as well; and a cable 181c for electrically connecting the transmission-reception section 181a and the wireless LAN communication board 120. This wireless LAN antenna 181 corresponds to one example of the antenna main body according to the present invention.

There is a frame 303 for supporting the LCD panel 301 inside the cover 302. Here, an upper face 303a on this frame 303 is a face that extends in the horizontal direction at the time of using this note PC 200 shown in FIG. 1, that is, when the top section 300 is brought into an open state.

The wireless LAN antenna 181 is secured onto this frame 303 in a manner that the transmission-reception section 181a stands on the upper face 303a as shown in FIG. 3.

The cover 302 is formed of a dielectric resin material, and is equipped with two walls 302a and a ceiling 302b. Here, the ceiling 302b has a double layer structure in which two ceiling boards 302b_1, 302b_2 are laminated, and further, the ceiling board is plate-shaped with a thickness that is thicker than that of the wall 302a. This cover 302 corresponds to one example of the antenna cover according to the present invention; the wall 302a and the ceiling 302b each correspond to one example of the wall and the ceiling according to the present invention; and the two ceiling boards 302b_1, 302b_2 correspond to one example of "a plurality of ceiling boards" according to the present invention. And a combination of the wireless LAN antenna 181 and the cover 302 corresponds to one embodiment of the antenna device according to the present invention. Further, the cover 302 corresponds to one embodiment of the antenna cover according to the present invention.

In this structure shown in FIG. 3, radio waves heading for in the horizontal direction mainly pass through the wall 302a, while radio waves heading for in the vertical direction mainly pass through the ceiling 302b.

Incidentally, the material of this cover 302 is a dielectric material as described above, and traditionally it has been considered that when the antenna is wrapped in a cover of dielectric material, if the thickness of the cover is thin enough and also the area of the cover is narrow enough for the wavelength of radio waves, the cover has little effect on the directivity of radio waves. However, this time, by an experiment like the following, which has been conducted on the occasion of the present invention, it has been found that even such a thin narrow cover can have an influence on the directivity of radio waves and furthermore, the influence is dependent on the structure of the cover. In the following, description will be given about this experiment.

In this experiment, an antenna that is equivalent to the wireless LAN antenna 181 in the present embodiment is used as an object of the experiment, and measurements are each obtained for directivity patterns of the antenna that is in a state of having no cover and for directivity patterns through a cover when the antenna of the experiment object is wrapped in an experimental cover. In addition, two types of experimental covers are prepared as the experimental cover, each having different structure to each other, and directivity patterns are measured in each case where each experimental cover is used.

Figure 4:
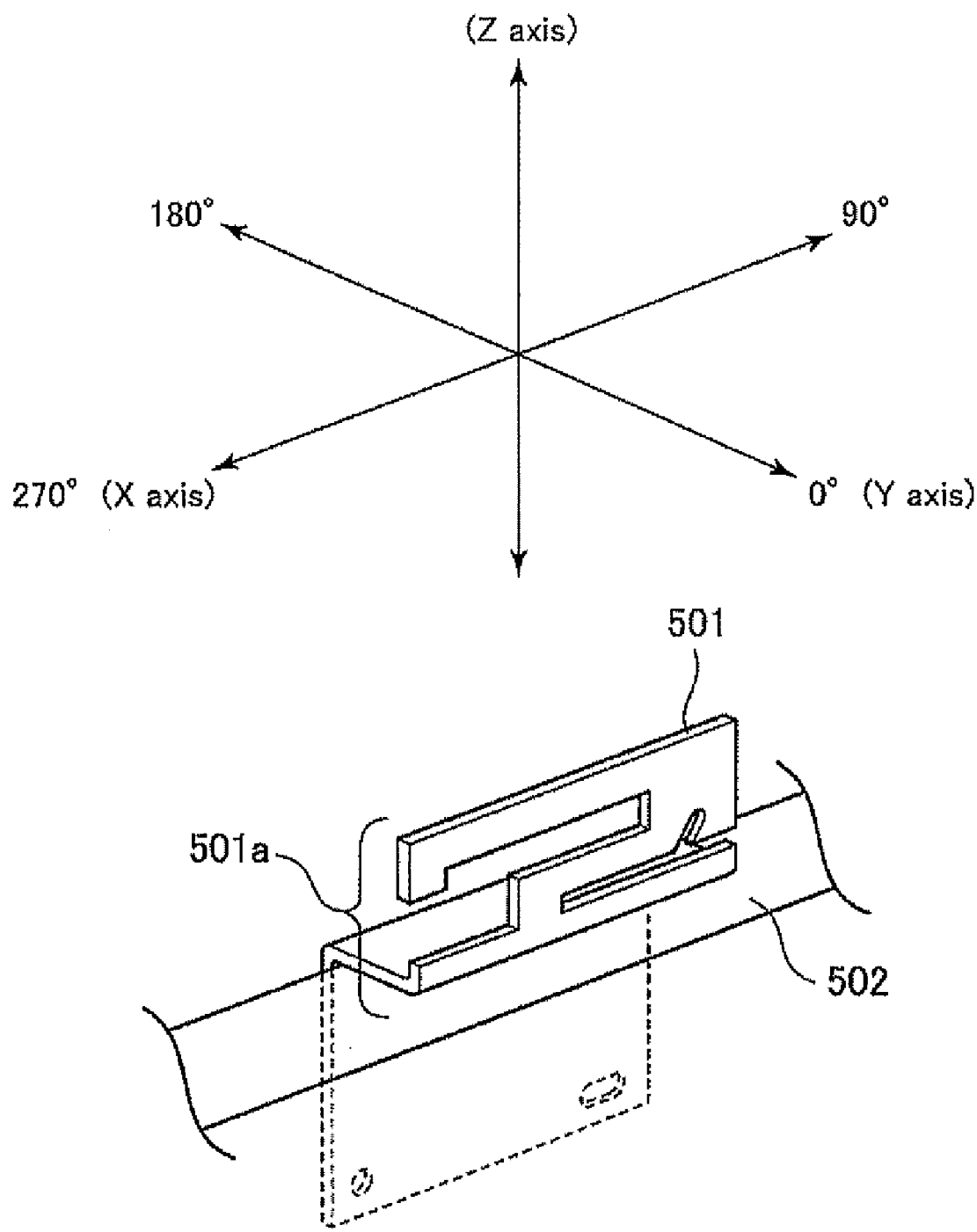
FIG. 4 is a diagram showing an antenna of an experiment object in a state where there is no cover.
Figure 5:
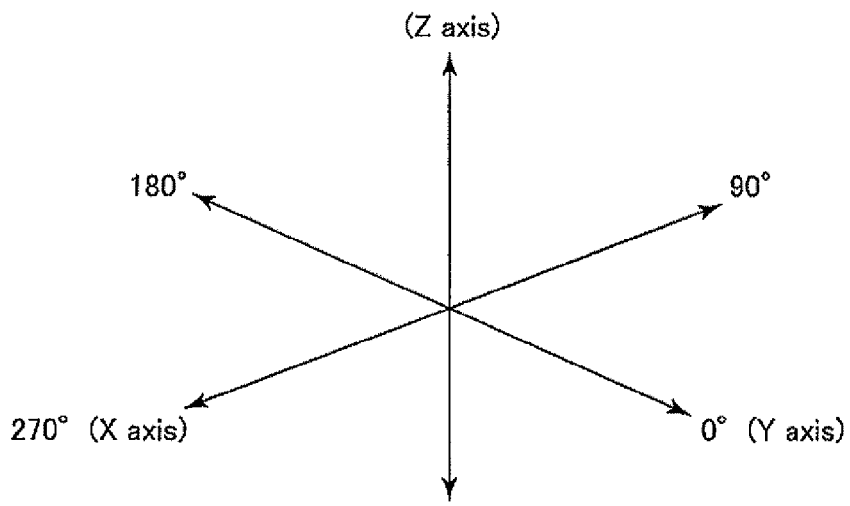
FIG. 5 is a diagram showing an antenna of an experiment object wrapped in a first experimental cover.
Figure 5:
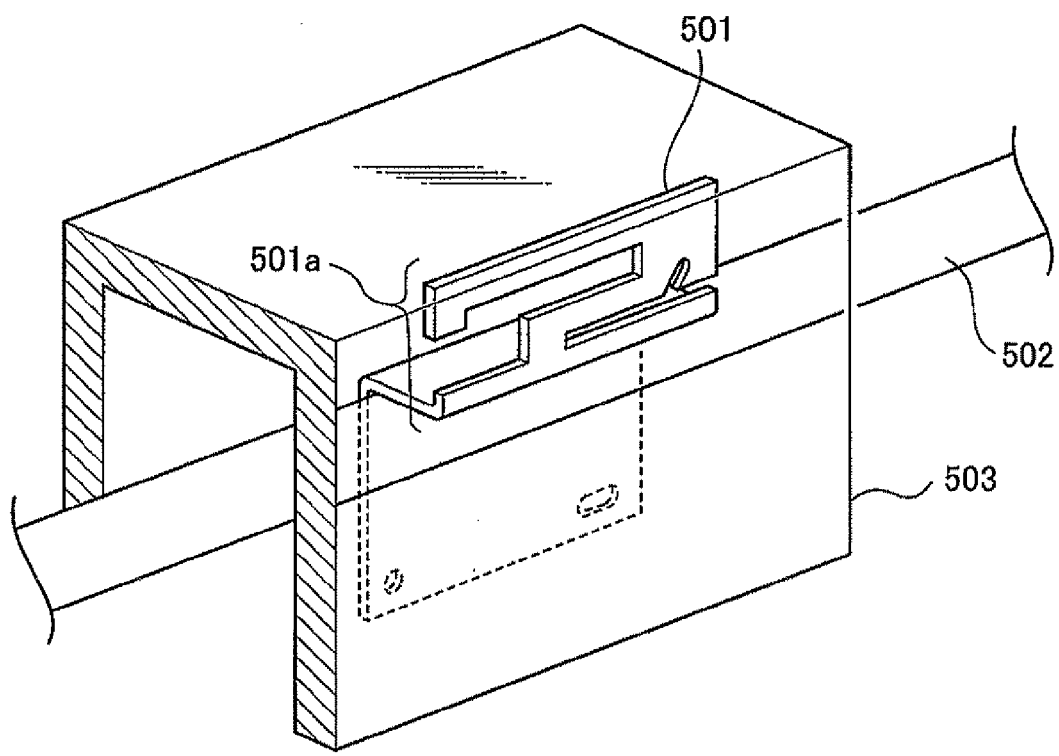

FIG. 4 is a diagram showing the antenna of the experiment object without a cover; FIG. 5 is a diagram showing the antenna of the experiment object wrapped in a first experimental cover; and FIG. 6 is a diagram showing the antenna of the experiment object wrapped in a second experimental cover.

Figure 6:
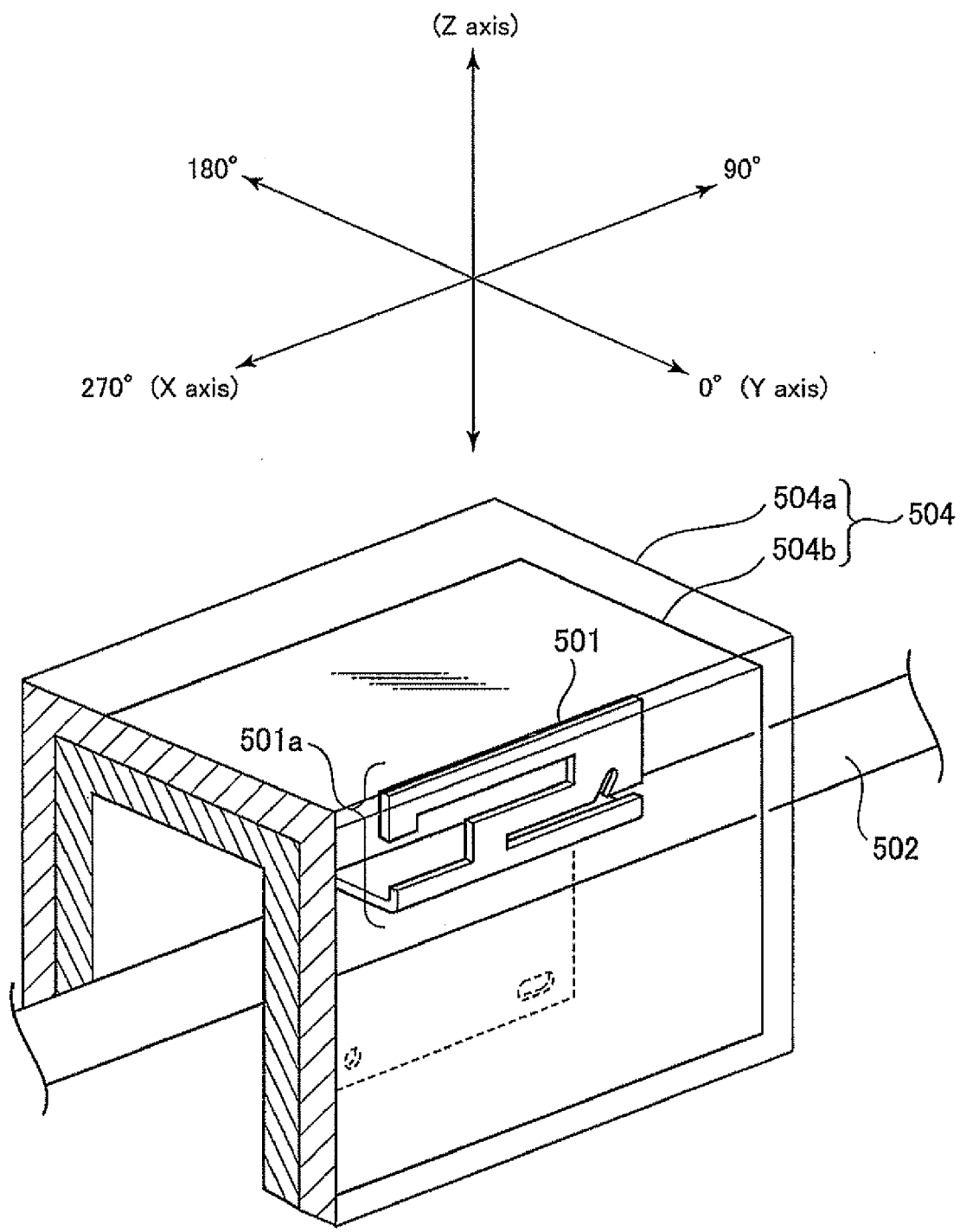
FIG. 6 is a diagram showing an antenna of an experiment object wrapped in a second experimental cover.

As shown in FIGS. 4, 5 and 6, an antenna 501 of the experiment object is secured in such a manner that its transmission-reception section 501a stands on a mounting face 502 for the experiment. Moreover, a first experimental cover 503 is a dielectric material having the thickness of 1 mm formed in the shape of U, whose ceiling and walls are each narrow enough in width with respect to the wavelength of radio waves. And as shown in FIG. 5, the first experimental cover 503 is fixed such that it wraps the antenna 501 of the experiment object by leaving 90-degree direction and 270-degree direction open, which are horizontal directions among 360-degree direction viewed from the antenna 501 of the experiment object. In addition, as shown in FIG. 6, a second experimental cover 504 has a double layer structure in which two dielectric materials 504a, 504b having the thickness of 1 mm formed in the shape of U like the above are laminated. Also this second experimental cover 504 is fixed in the same manner as the first experimental cover 503, such that it wraps the antenna 501 of the experiment object by leaving 90-degree direction and 270-degree direction open, viewed from the antenna 501 of the experiment object.

In this experiment, measurements of directivity patterns in the 360-degree direction viewed from the antenna 501 of the experiment object are taken for each case where there is no cover (See FIG. 4) and where there is the first experimental cover 503 (See FIG. 6), on the XY plane in the horizontal direction with the antenna 501 of the experiment object as the center. Also the directivity patterns are measured for each of vertically polarized waves and horizontally polarized waves transmitted and received at the antenna 501 of the experiment object, and the measurements are taken for 12 types of frequencies from 2400 MHz to 5875 MHz among the frequencies of radio waves that are often used in the wireless LAN communication.

Hereinafter, results of the experiment will be shown.

Figure 7:
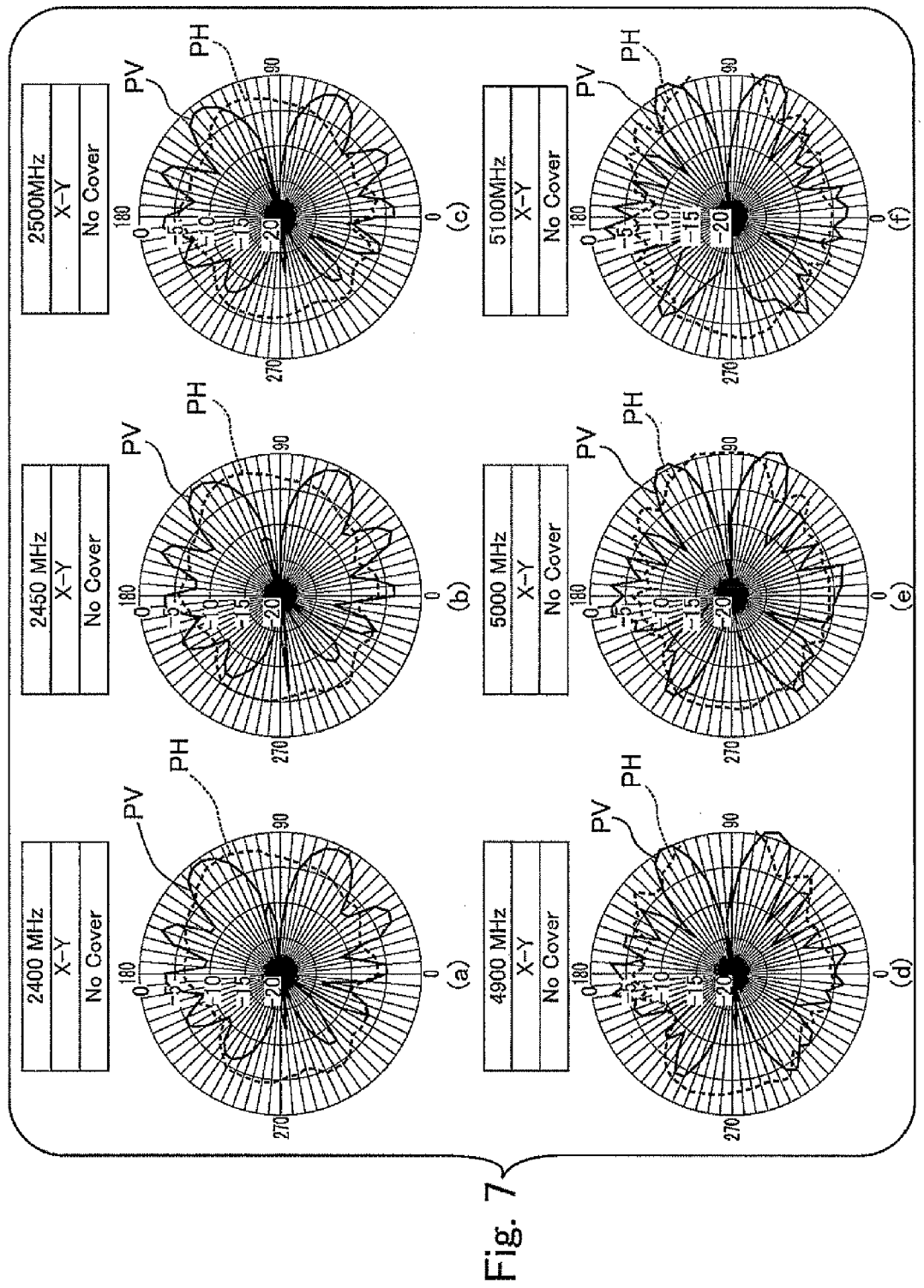
FIG. 7 shows directivity patterns measured for six types of frequencies from 2400 MHz to 5100 MHz in a state where there is no cover.
Figure 8:
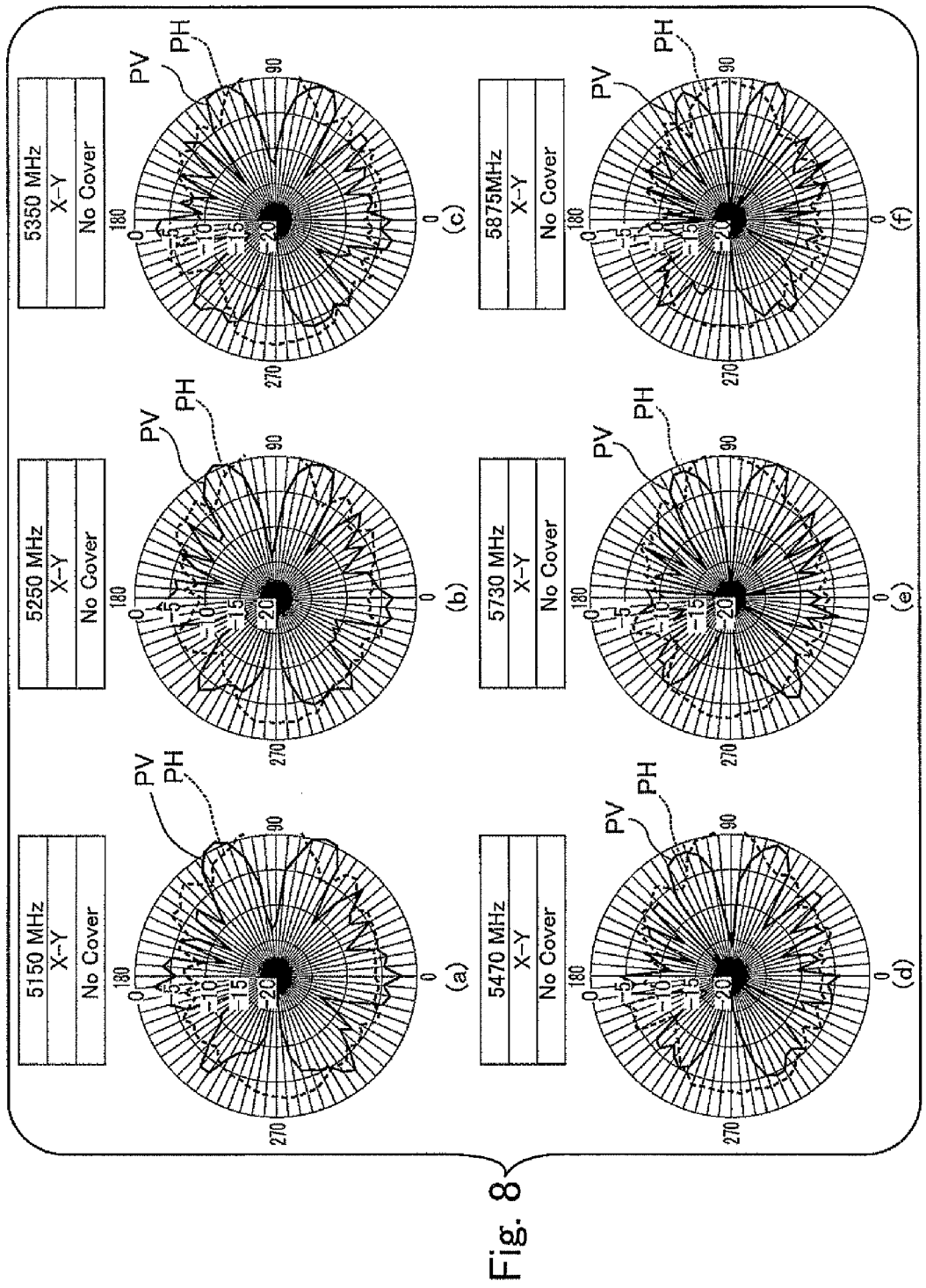
FIG. 8 shows directivity patterns measured for six types of frequencies from 5150 MHz to 5875 MHz in a state where there is no cover.

FIG. 7 shows directivity patterns measured for six types of frequencies from 2400 MHz to 5100 MHz in a state where there is no cover, and FIG. 8 is a diagram showing directivity patterns measured for six types of frequencies from 5150 MHz to 5875 MHz in a state where there is no cover.

Part (a), Part (b), Part (c), Part (d), Part (e) and Part (f) of FIG. 7 show a directivity pattern PV of vertically polarized waves and a directivity pattern PH of horizontally polarized waves, each measured at the frequency of 2400 MHz, 2450 MHz, 2500 MHz, 4900 MHz, 5000 MHz and 5100 MHz. And Part (a), Part (b), Part (c), Part (d), Part (e) and Part (f) of FIG. 8 show a directivity pattern PV of vertically polarized waves and a directivity pattern PH of horizontally polarized waves, each measured at the frequency of 5150 MHz, 5250 MHz, 5350 MHz, 5470 MHz, 5730 MHz and 5875 MHz.

Figure 9:
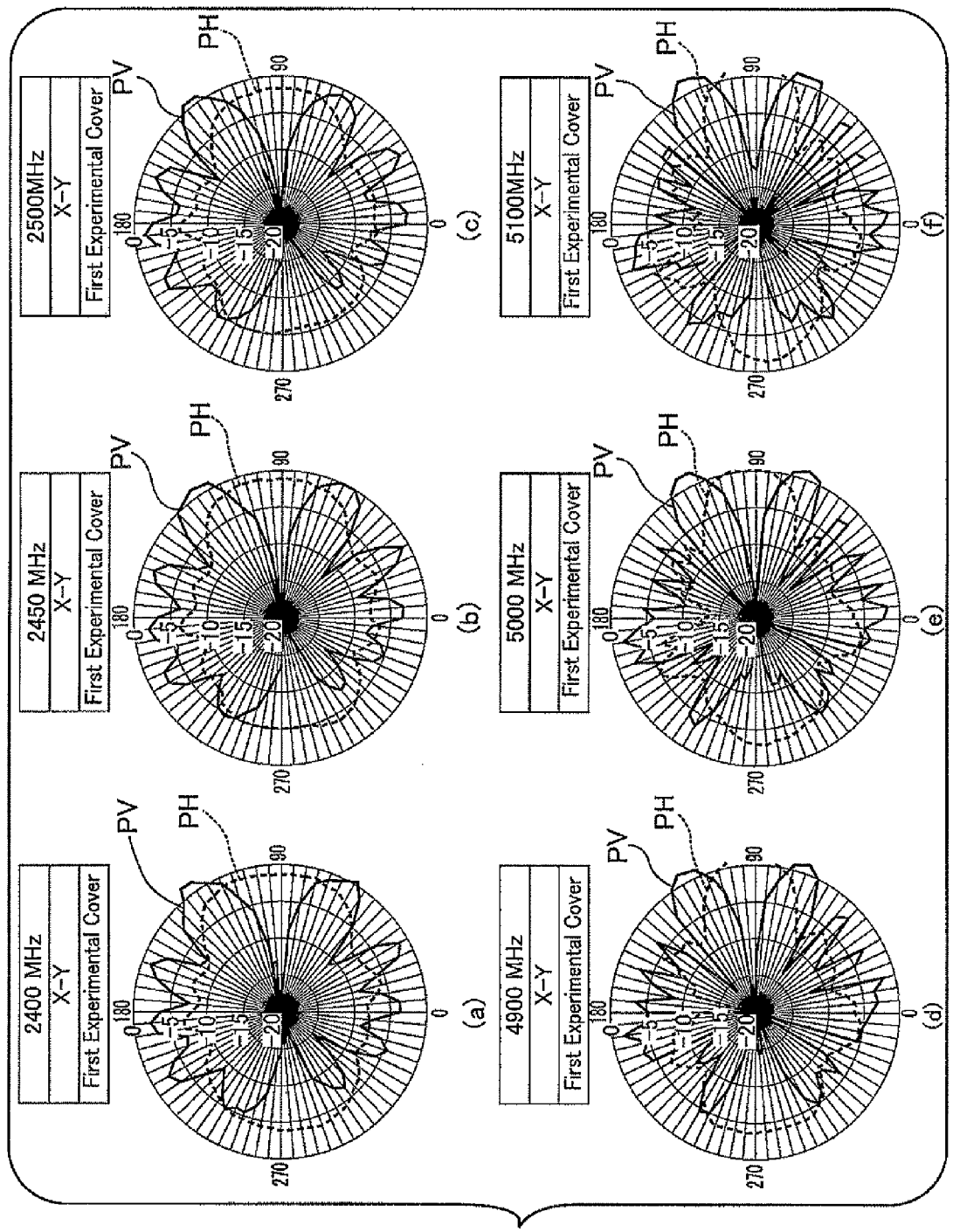
FIG. 9 shows directivity patterns measured for six types of frequencies from 2400 MHz to 5100 MHz in a state where a first experimental cover 503 exists.
Figure 10:
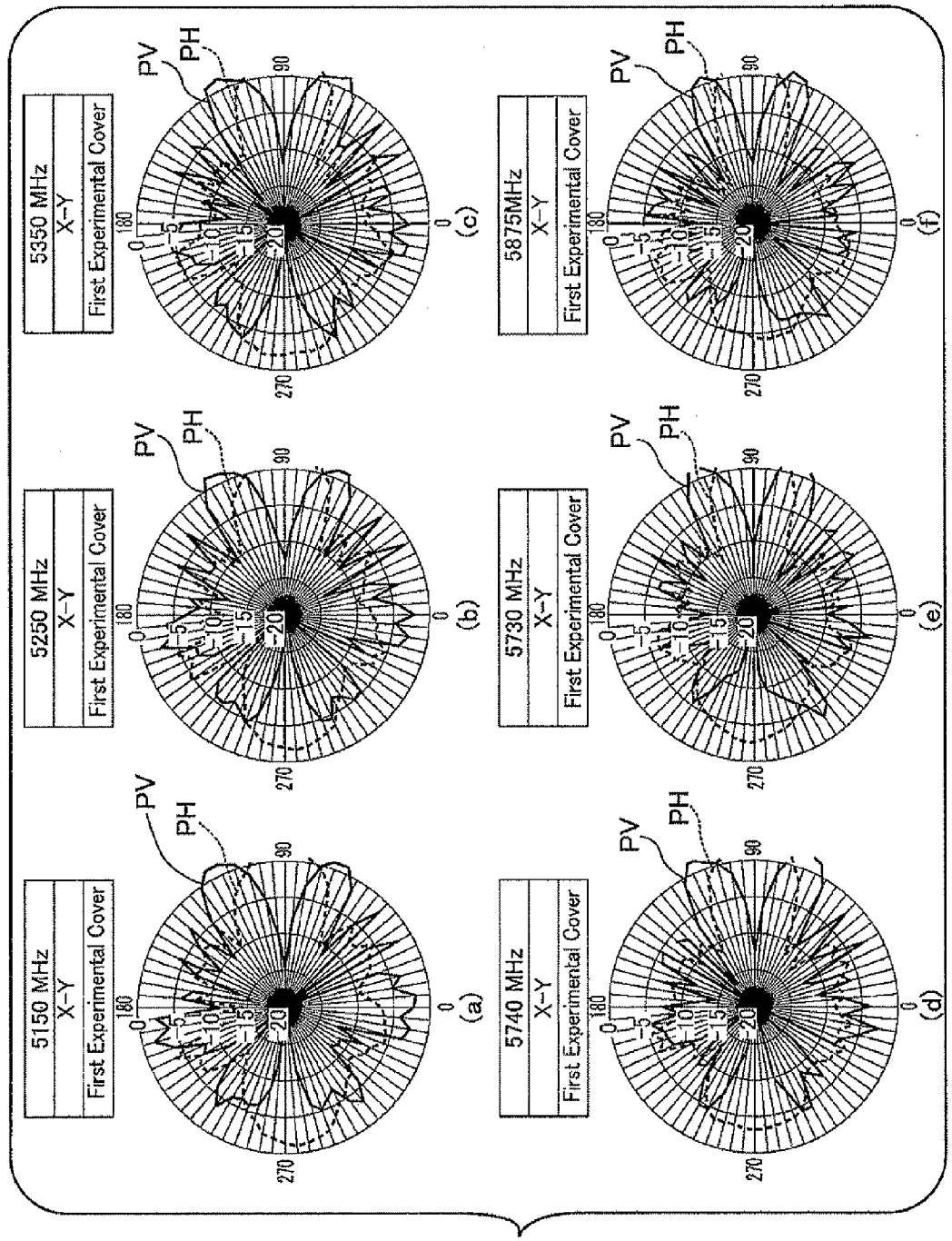
FIG. 10 shows directivity patterns measured for six types of frequencies from 5150 MHz to 5875 MHz in a state where the first experimental cover 503 exists.

FIG. 9 shows directivity patterns measured for six types of frequencies from 2400 MHz to 5100 MHz in a state where the first experimental cover 503 exists, and FIG. 10 shows directivity patterns measured for six types of frequencies from 5150 MHz to 5875 MHz in a state where the first experimental cover 503 exists.

In the same manner as in FIGS. 7 and 8, Part (a), Part (b), Part (c), Part (d), Part (e) and Part (f) of FIG. 9 show a directivity pattern PV of vertically polarized waves and a directivity pattern PH of horizontally polarized waves, each measured at the frequency of 2400 MHz, 2450 MHz, 2500 MHz, 4900 MHz, 5000 MHz and 5100 MHz respectively. And Part (a), Part (b), Part (c), Part (d), Part (e) and Part (f) of FIG. 10 show a directivity pattern PV of vertically polarized waves and a directivity pattern PH of horizontally polarized waves, each measured at the frequency of 5150 MHz, 5250 MHz, 5350 MHz, 5470 MHz, 5730 MHz and 5875 MHz respectively.

Here, a comparison is made between each directivity pattern when there is no cover shown in FIGS. 7, 8 and each directivity pattern when the first experimental cover 503 exists shown in FIGS. 9, 10 by comparing the directivity patterns at the same frequency. Then, it has been found that in any frequencies, the directivity around zero-degree direction and 180-degree direction in the directivity patterns when the first experimental cover 503 exists becomes weaker than the directivity around zero-degree direction and 180-degree direction in the directivity patterns when there is no cover. Also it has been found that the directivity around 90-degree direction and 270-degree direction in the directivity patterns when the first experimental cover 503 exists becomes stronger than the directivity around 90-degree direction and 270-degree direction in the directivity patterns when there is no cover.

Here, the direction around zero-degree and 180-degree are the direction that is wrapped in the first experimental cover 503 as shown in FIG. 3. From the result of this experiment, it has been found that radio waves transmitted and received at the antenna 501 of the experiment object are diffused by the first experimental cover 503 and thus in the directivity pattern of radio waves, the directivity becomes weaker in the direction that is wrapped with the wall of the first experimental cover 503 and the directivity pattern is deformed into a shape that shows a strong directivity in an open direction. Also when each of the above-described frequencies is converted into wavelength, the wavelength becomes the longest at 2400 MHz, which is about 125 mm. Therefore, it can be understood that even if the area of the cover is narrow enough and the thickness of the cover is thin enough for the wavelength of radio waves, the diffusion effect of the dielectric cover is surely produced toward radio waves.

Figure 11:
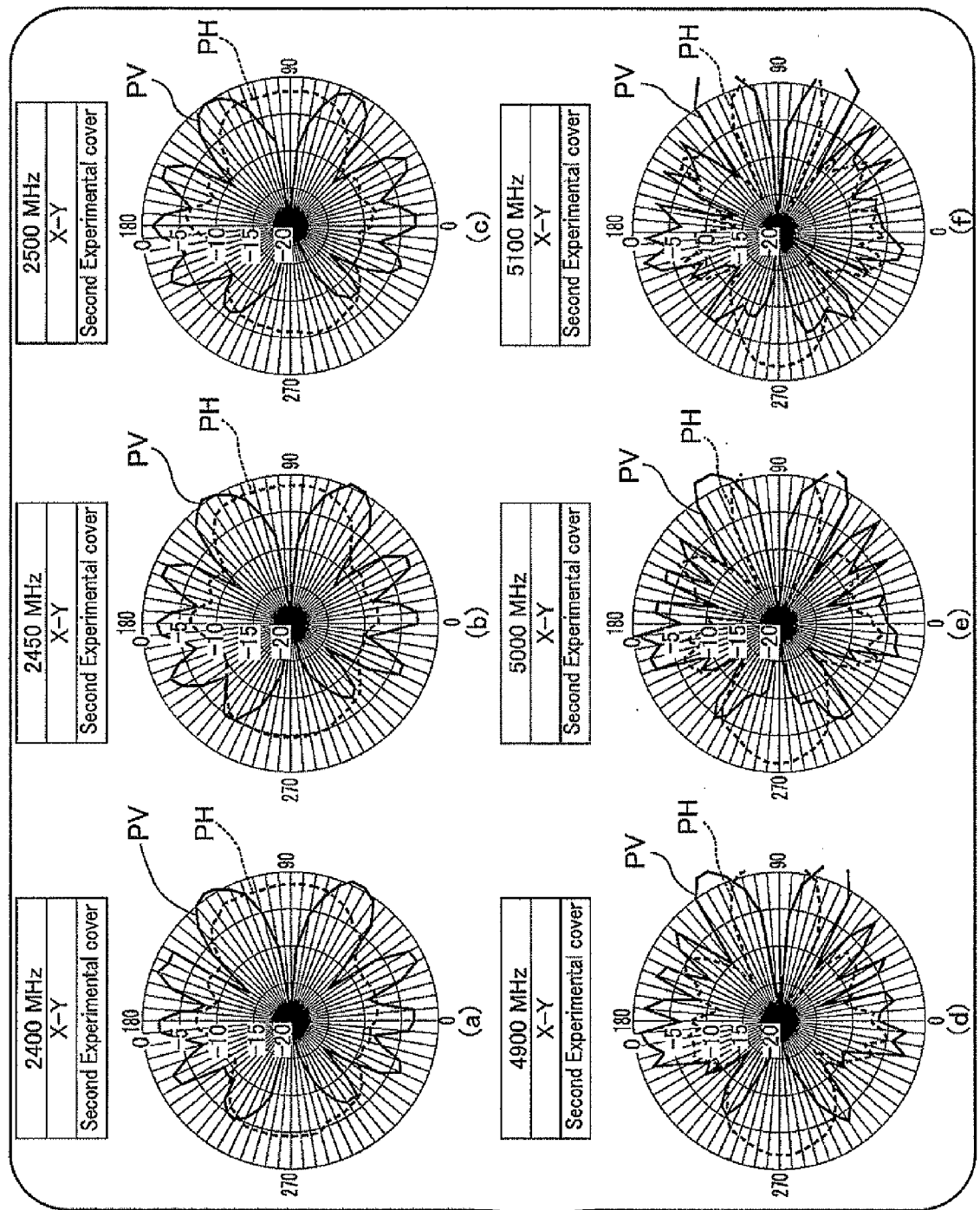
FIG. 11 shows directivity patterns measured for six types of frequencies from 2400 MHz to 5100 MHz in a state where a second experimental cover 504 exists.
Figure 12:
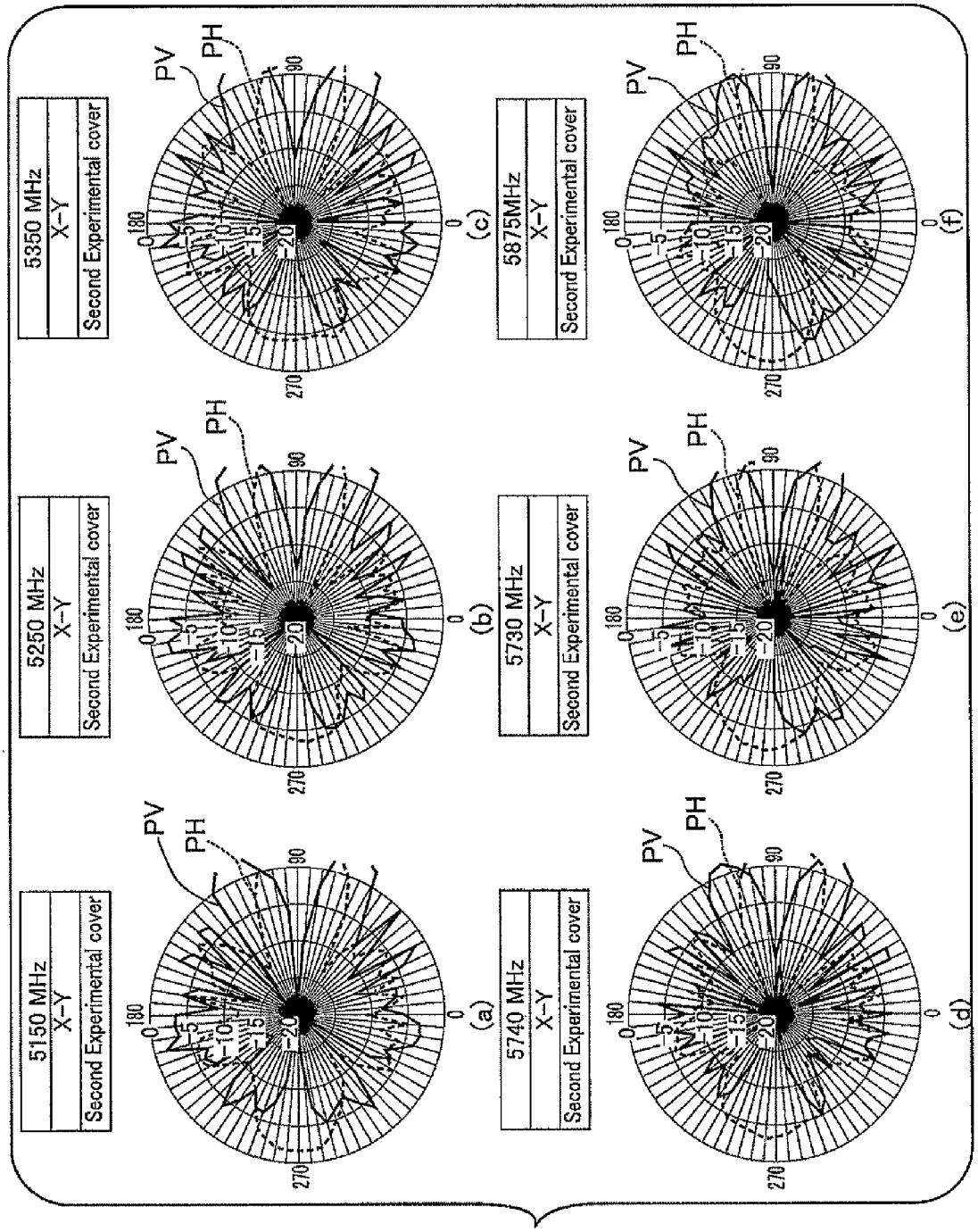
FIG. 12 shows directivity patterns measured for six types of frequencies from 5150 MHz to 5875 MHz in a state where the second experimental cover 504 exists.

FIG. 11 shows directivity patterns measured for six types of frequencies from 2400 MHz to 5100 MHz in a state where a second experimental cover 504 exists, and FIG. 12 shows directivity patterns measured for six types of frequencies from 5150 MHz to 5875 MHz in a state where the second experimental cover 504 exists.

Similarly to FIGS. 7, 8, 9 and 10, Part (a), Part (b) Part (c), Part (d), Part (e) and Part (f) of FIG. 11 show a directivity pattern PV of vertically polarized waves and a directivity pattern PH of horizontally polarized waves, each measured at the frequency of 2400 MHz, 2450 MHz, 2500 MHz, 4900 MHz, 5000 MHz and 5100 MHz, respectively. Part (a), Part (b), Part (c), Part (d), Part (e) and Part (f) of FIG. 12 show a directivity pattern PV of vertically polarized waves and a directivity pattern PH of horizontally polarized waves, each measured at the frequency of 5150 MHz, 5250 MHz, 5350 MHz, 5470 MHz, 5730 MHz and 5875 MHz, respectively.

In the same manner as each directivity pattern shown in FIGS. 9 and 10, each directivity pattern shown in these FIGS. 11 and 12 has been deformed into a shape that shows a weak directivity in the direction that is covered with the wall and a strong directivity in the direction that is open, compared to each directivity pattern when there is no cover shown in FIGS. 7 and 8. Furthermore, when a comparison is made between each directivity pattern about the second experimental cover 504 shown in FIGS. 11, 12 and each directivity pattern about the first experimental cover 503 shown in FIGS. 9, 10, it has been found that the degree of deformation is larger in each directivity pattern about the second experimental cover 504 than each directivity pattern about the first experimental cover 503. Here, the second experimental cover 504 has a double layer structure made of two dielectric materials 504a, 504b (See FIG. 7) like the above, and as a result, the thickness of the cover is double the thickness of the first experimental cover 503. From this, it can be understood that the diffusion effect of a dielectric cover on radio waves is dependent on the structure of the cover.

As has been described above, by the experiment described with reference to FIGS. 4 to 12, it has been found that even a dielectric cover that is thin enough and narrow enough for the wavelength of radio waves can exercise a diffusion effect on radio waves and furthermore, the diffusion effect is dependent on the structure of the cover.

The description will continue by going back to FIG. 3 once more.

In this structure shown in FIG. 3, the wireless LAN antenna 181 is completely wrapped in the cover 302. At this time, radio waves heading for in the horizontal direction pass through the wall 302a of the cover 302 while radio waves heading for in the vertical direction pass through the ceiling 302b of the cover 302. However, in the present embodiment, the ceiling 302b has a double layer structure and its thickness is two times of that of the wall 302a. Thereby, radio waves passing through the ceiling 302b are diffused toward the side of the wall 302a and directivity becomes stronger in the horizontal direction than in the vertical direction, and thus a desirable directivity pattern in the wireless LAN can be obtained. Additionally, in the present embodiment, such a desirable directivity pattern can be obtained only through a contrivance to the structure of the ceiling 302b of the cover 302, without changing the structure of the wireless LAN antenna 181 itself. That is, in the present embodiment, such a desirable directivity pattern can be obtained while suppressing the increase in installation space.

Up to this, the description has been made about the example in which the ceiling of the cover for wrapping the antenna has a double layer structure and has a thickness thicker than the wall for the purpose of obtaining a desirable directivity pattern in the wireless LAN. However, the present invention is not limited to this. For example, an antenna cover according to the present invention may be one that adds a contrivance to the shape of a ceiling, which will be described hereinafter.

In the following, description will be given about another example of the antenna cover according to the present invention. Since most elements are similar to the embodiment described above except for the antenna cover, redundant description is omitted.

Figure 13:
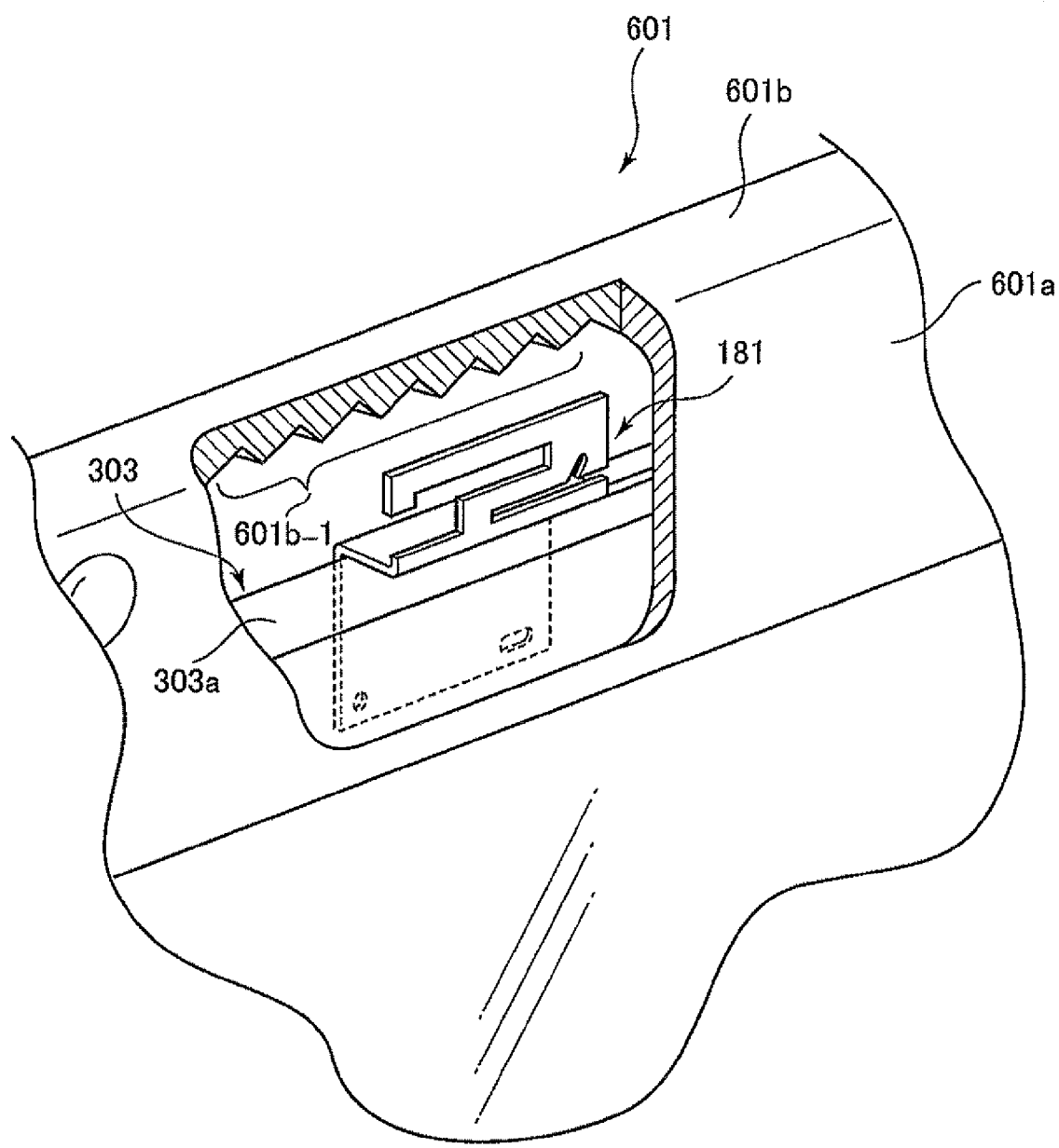
FIG. 13 is a diagram showing another example of the antenna cover according to the present invention.

FIG. 13 is a diagram showing another example of the antenna cover according to the present invention.

In FIG. 13, the antenna and the frame, which are common with those in FIG. 3, are respectively designated as the identical reference numbers "181" and "303."

A cover 601 shown in this FIG. 13, which corresponds to one example of the antenna cover according to the present invention, is equipped with a wall 601a having almost the same shape as the wall 302a of the cover 302 shown in FIG. 3 and a ceiling 601b on which a sawtooth convexo-concave 601b_1 is patterned on the side of the wireless LAN antenna 181.

In this cover 601 shown in FIG. 13, directivity is weakened for the ceiling 601b not only by the action of the dielectric material but also by the reflection, refraction, diffraction or the like caused by the sawtooth convexo-concave 601b_1. On the other hand, radio waves heading for in the horizontal direction and passing through the wall 601a are only subject to the action of the dielectric material so that directivity becomes stronger in the horizontal direction than in the vertical direction, which makes it possible to obtain a desirable directivity pattern in wireless LAN. Also in the example shown in this FIG. 13, similarly to the example shown in FIG. 3, a desirable directivity pattern like this can be obtained only through a contrivance to the shape of the cover 601, without changing the wireless LAN antenna 181 itself. That is, also in the example shown in this FIG. 13, similarly to the example shown in FIG. 3, a desirable directivity pattern can be obtained easily suppressing the increase in installation space.

In this way, in another example in FIG. 13, a desirable directivity pattern is obtained in the horizontal direction through the diffusion of radio waves heading for the ceiling 601b by the sawtooth convexo-concave 601b_1. In the following, for the purpose of demonstrating that such a sawtooth convexo-concave on the antenna cover is useful for diffusing radio waves, an description will be made about an experiment conducted by the inventors of the present invention.

In this experiment, in order to obtain an effect for an actual wireless LAN antenna in a note PC, not a wireless LAN antenna by itself as shown in the aforementioned FIGS. 4 to 6, but a note PC mounted with a wireless LAN antenna is used. In addition, this note PC is not the one mounted with a single wireless LAN antenna as shown in FIG. 1, but is mounted with two wireless LAN antennas, which will be described in the following.

Figure 14:
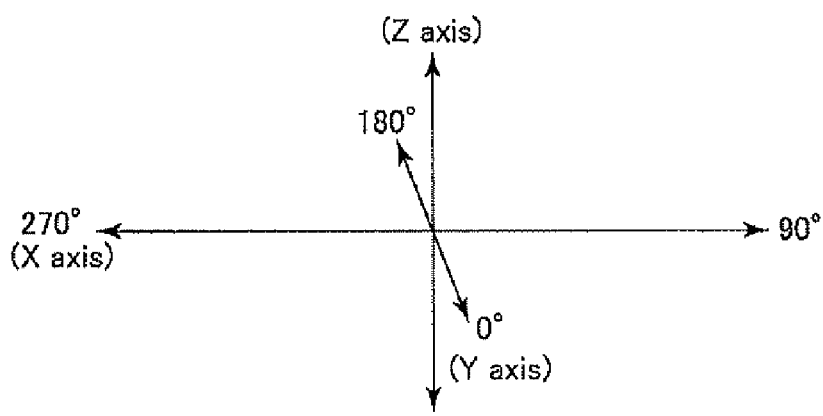
FIG. 14 is an outlook of the note PC used for the experiment to verify that sawtooth convexo-concave on the antenna cover is useful for diffusing radio waves.
Figure 14:
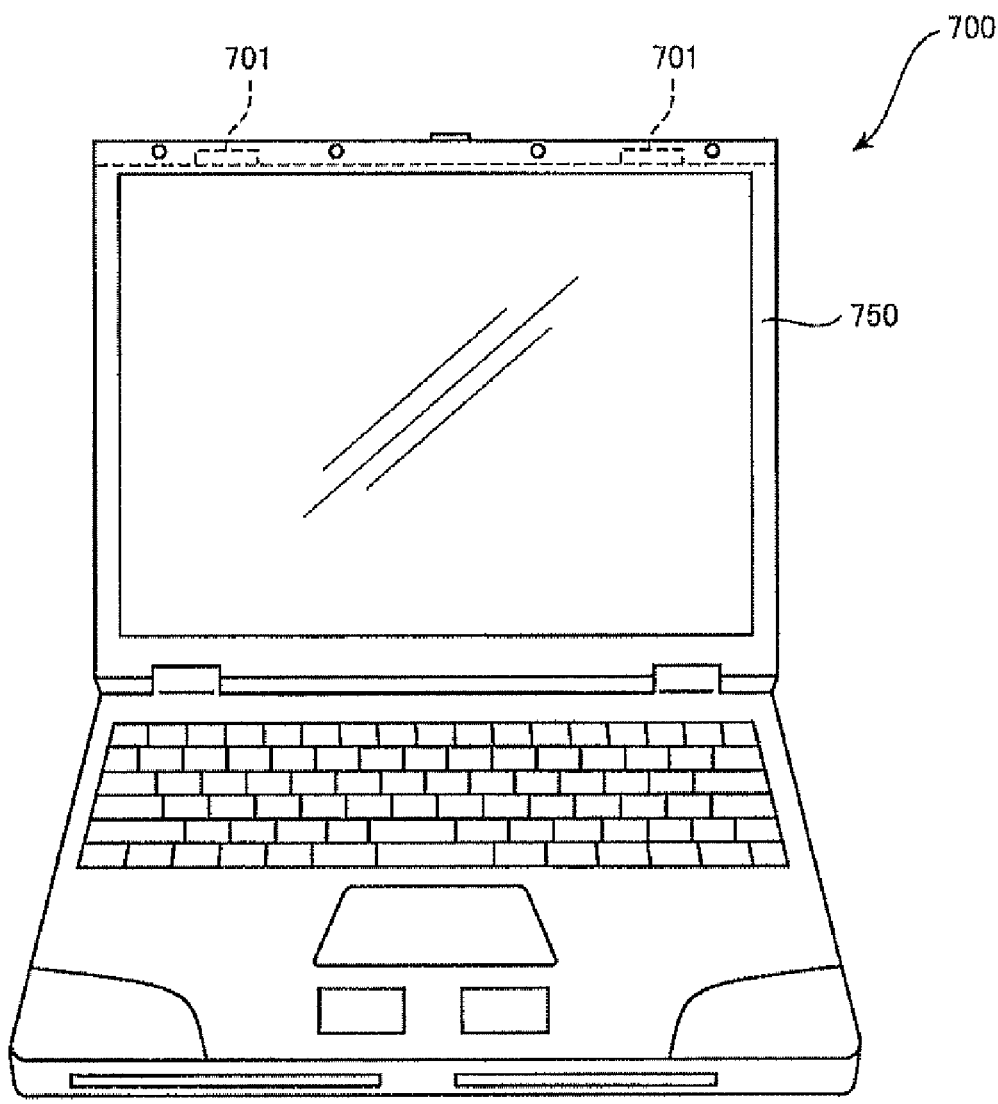

FIG. 14 is an outlook of the note PC used in the experiment to verify that sawtooth convexo-concave on the antenna cover is useful for diffusing radio waves.

Here, a note PC 700 shown in this FIG. 14 is the same as the note PC 100 shown in FIG. 1 except that the note PC 700 is equipped with two wireless LAN antennas and its structure of the cover for wrapping the wireless LAN antennas is different from the structure in FIG. 1. Therefore, in the following, description will be given about these differences and redundant description is omitted.

This note PC 700 is equipped with two wireless LAN antennas equivalent to the wireless LAN antenna 181 incorporated in the note PC 100 shown in FIG. 1. These two wireless LAN antennas 701 are each included at end positions on the upper left side and on the upper right side of a top section 750 in this note PC 700 when this note PC is brought into an open state.

Here, in this note PC 700, diversity control is executed at the time of receiving radio waves, which adopts radio waves having the highest strength as receiving radio waves among four types of radio waves in all, including vertically polarized waves and horizontally polarized waves received at the wireless LAN antenna 701 on the left side, and vertically polarized waves and horizontally polarized waves received at the wireless LAN antenna 701 on the right side. Also under this diversity control, at the time of transmitting radio waves, out of these two wireless LAN antennas 701, the one that has received the strongest radio waves just before the transmission is adopted for transmission.

Furthermore, in the note PC 700 shown in this FIG. 14, the cover wrapping the wireless LAN antenna 701 is a simple one whose ceiling has the same structure as the wall, different from the cover 302 shown in FIG. 3.

In this experiment, first of all, directivity patterns of radio waves in the note PC 700 shown in this FIG. 14 has been measured.

Figure 15:
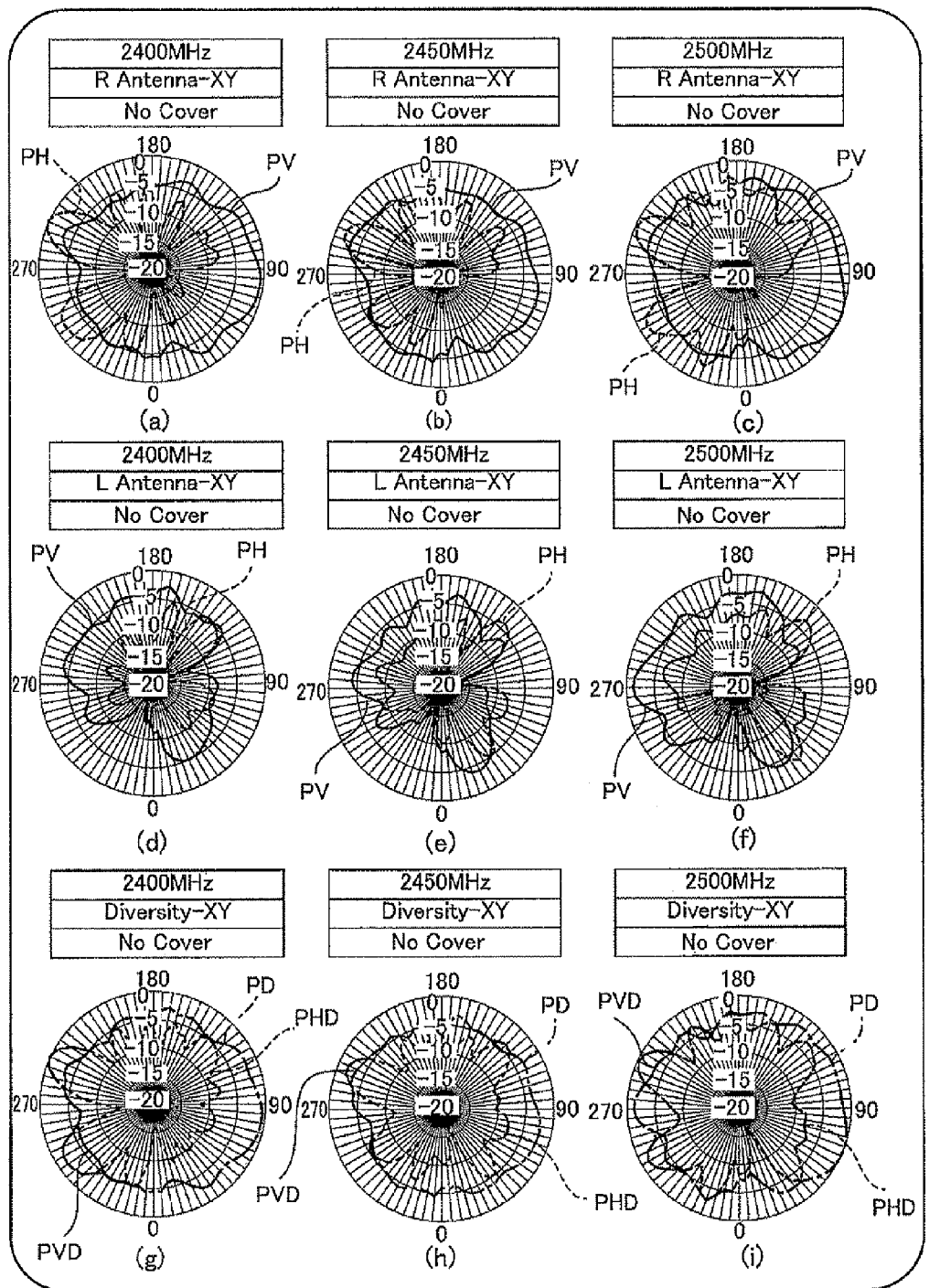
FIG. 15 shows directivity patterns measured for three types of frequencies from 2400 MHz to 2500 MHz in the note PC 700 shown in FIG. 14.

FIG. 15 shows directivity patterns measured for three types of frequencies from 2400 MHz to 2500 MHz in the note PC 700 shown in FIG. 14.

Part (a), Part (b) and Part (c) of FIG. 15 show directivity patterns PV of vertically polarized waves and directivity patterns PH of horizontally polarized waves, each measured at the frequency of 2400 MHz, 2450 MHz and 2500 MHz respectively for the wireless LAN antenna 701 on the right side of the note PC 700 shown in FIG. 14. And Part (d), Part (e) and Part (f) of FIG. 15 show directivity patterns PV of vertically polarized waves and directivity patterns PH of horizontally polarized waves, each measured at these three types of frequencies for the wireless LAN antenna 701 on the left side of the note PC 700 shown in FIG. 14.

Here, the measurement of directivity patterns of Part (a), Part (b) and Part (c) of FIG. 15 is carried out by supplying electric signals for transmission only to the wireless LAN antenna 701 on the right side, and the measurement of directivity patterns of Part (d), Part (e) and Part (f) is carried out by supplying electric signals for transmission only to the wireless LAN antenna 701 on the left side.

Additionally, in Part (g), Part (h) and Part (i) of FIG. 15, directivity patterns that will be able to be obtained when the diversity control is conducted for the both left and right antennas each at these three types of frequencies are shown through calculation based on the result of the measurement shown in the aforementioned Part (a) to Part (f). In this calculation, first of all, a processing that adopts a greater value between the values of each pattern, through the comparison of directivity patterns PV of vertically polarized waves each on the left and right antennas at a frequency corresponding to each other is executed over 360-degree on the XY plane, which creates a directivity pattern PVD of vertically polarized waves under the diversity control. Also a similar processing is executed for directivity patterns PH of horizontally polarized waves each on the left and right antennas at a frequency corresponding to each other, which creates a directivity pattern PHD of horizontally polarized waves under the diversity control. Furthermore, a processing that adopts a greater value for each frequency between the values of each pattern, through the comparison of two types of directivity patterns PVD, PHD to each other under the diversity control is executed over 360-degree on the XY plane, which creates final directivity patterns PD under the diversity control. In these Part (g), Part (h) and Part (i) of FIG. 15, the directivity pattern PVD of vertically polarized waves under the diversity control almost overlaps the final directivity patterns PD under the diversity control.

In this experiment, measurements and calculations like this have been conducted for frequencies up to 5600 MHz as shown in the following.

Figure 16:
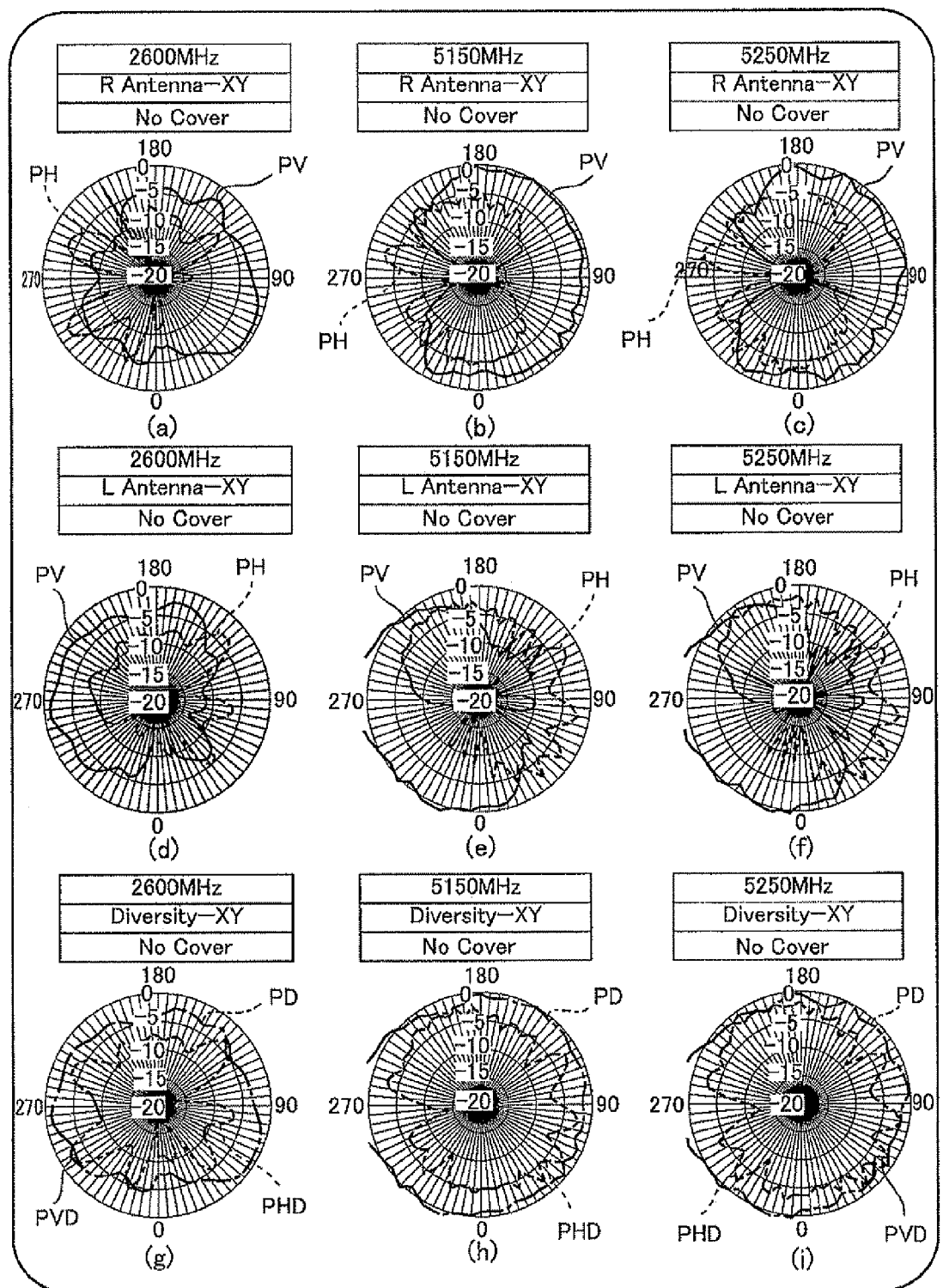
FIG. 16 shows directivity patterns measured for three types of frequencies from 2600 MHz to 5250 MHz in the note PC 700 in FIG. 14.
Figure 17:
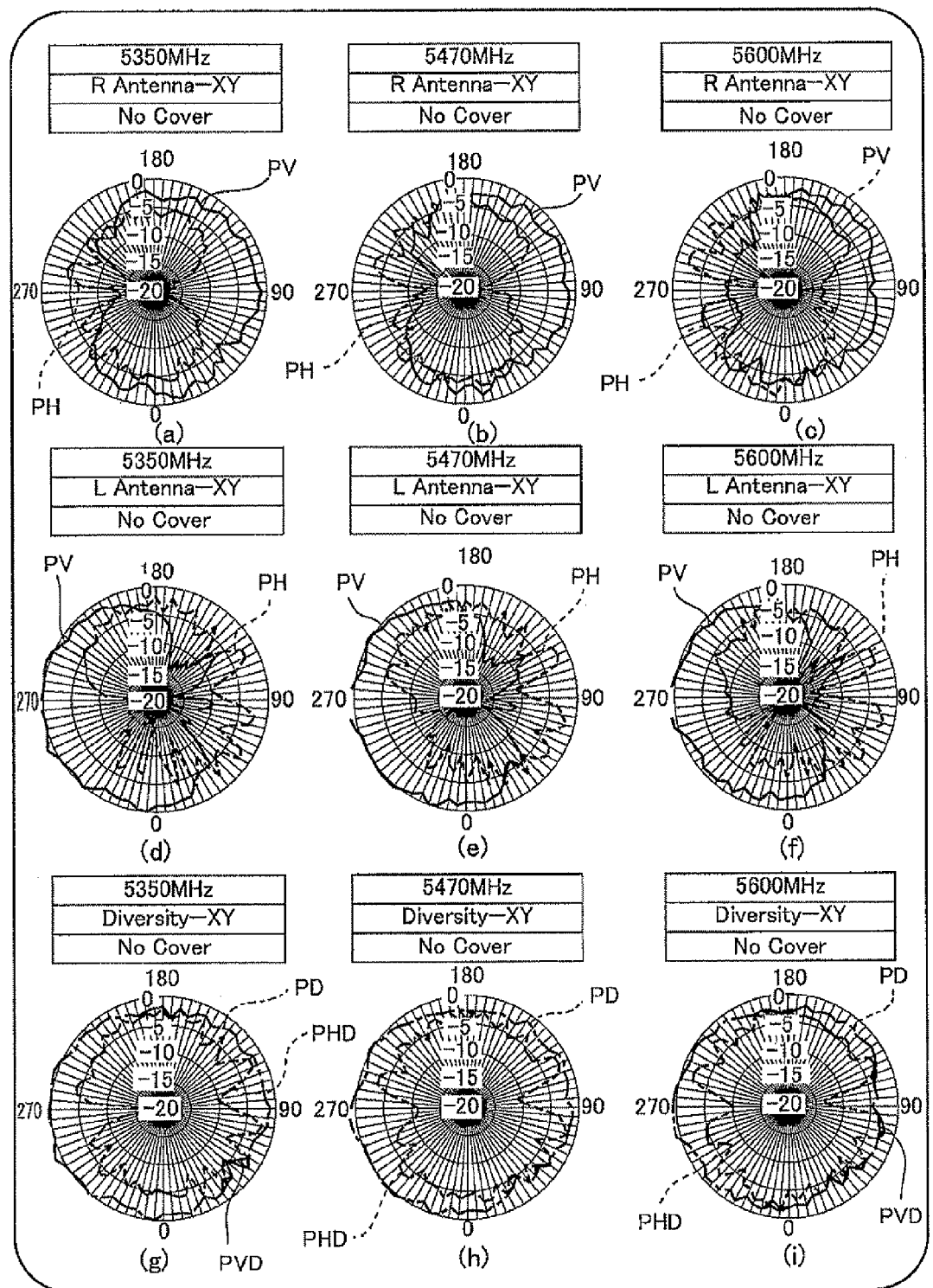
FIG. 17 shows directivity patterns measured for three types of frequencies from 5350 MHz to 5600 MHz in the note PC 700 in FIG. 14.
Figure 18:
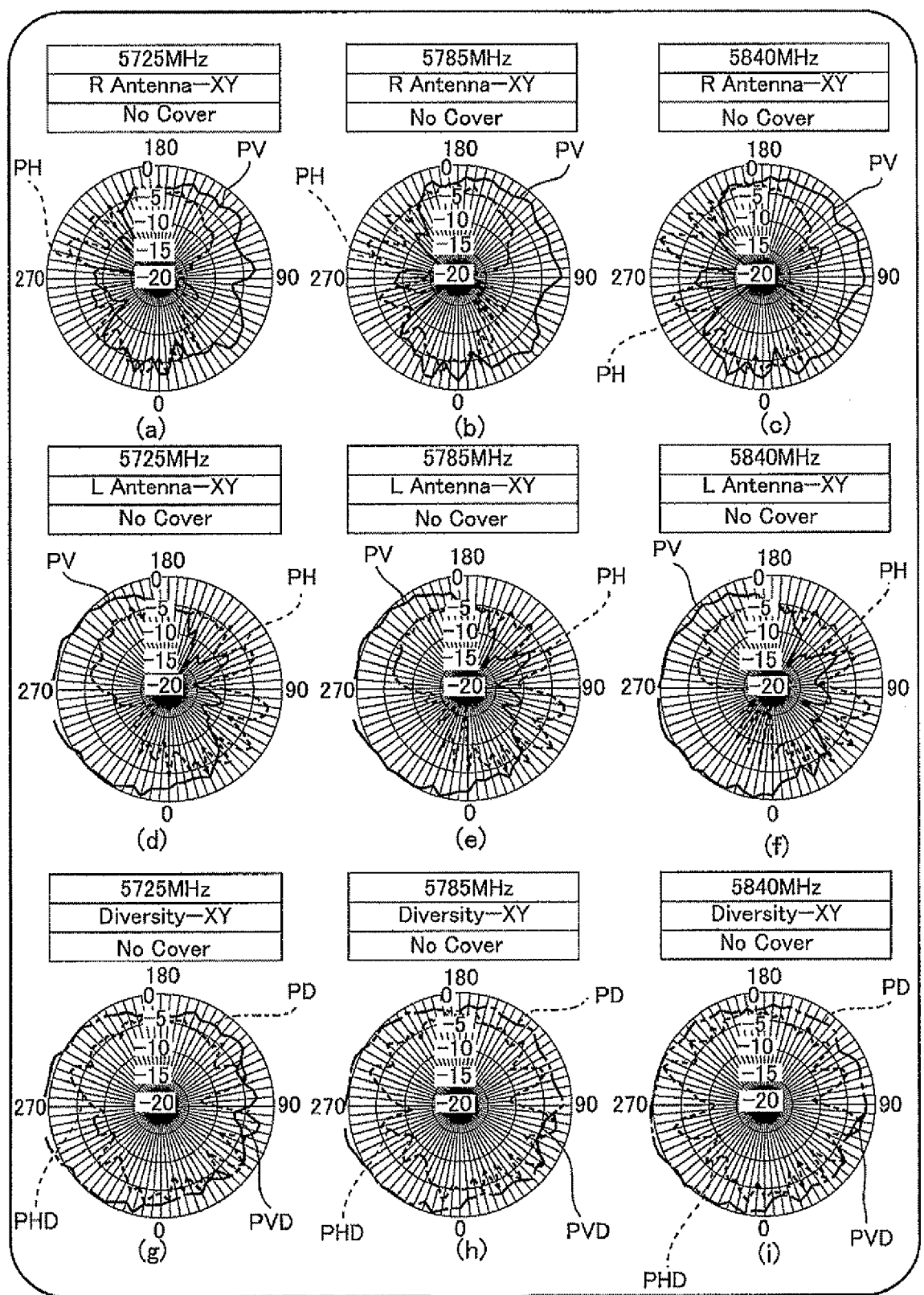
FIG. 18 shows directivity patterns measured for three types of frequencies from 5725 MHz to 5840 MHz in the note PC 700 in FIG. 14.

FIG. 16 shows directivity patterns measured for three types of frequencies from 2600 MHz to 5250 MHz in the note PC 700 shown in FIG. 14. FIG. 17 shows directivity patterns measured for three types of frequencies from 5350 MHz to 5600 MHz in this note PC 700. FIG. 18 shows directivity patterns measured for three types of frequencies from 5725 MHz to 5840 MHz in this note PC 700.

Part (a), Part (b) and Part (c) of FIG. 16 show directivity patterns PV of vertically polarized waves and directivity patterns PH of horizontally polarized waves, each measured at the frequency of 2600 MHz, 5150 MHz and 5250 MHz respectively for the wireless LAN antenna 701 on the right side of the note PC 700 shown in FIG. 14. Part (d), Part (e) and Part (f) show directivity patterns PV of vertically polarized waves and directivity patterns PH of horizontally polarized waves, each measured at these three types of frequencies for the wireless LAN antenna 701 on the left side of the note PC 700 shown in FIG. 14. Furthermore, Part (g), Part (h) and Part (i) of FIG. 16 show directivity pattern PVD of vertically polarized waves, directivity patterns PHD of horizontally polarized waves and final directivity patterns PD, each measured at these three types of frequencies under the diversity control.

Moreover, Part (a), Part (b) and Part (c) of FIG. 17 show directivity patterns PV of vertically polarized waves and directivity patterns PH of horizontally polarized waves, each measured at the frequency of 5350 MHz, 5470 MHz and 5600 MHz respectively for the wireless LAN antenna 701 on the right side of the note PC 700 shown in FIG. 14. And Part (d), Part (e) and Part (f) show directivity patterns PV of vertically polarized waves and a directivity pattern PH of horizontally polarized waves, each measured at these three types of frequencies for the wireless LAN antenna 701 on the left side of the note PC 700 shown in FIG. 14. Furthermore, Part (g), Part (h) and Part (i) of FIG. 17 show directivity pattern PVD of vertically polarized waves, directivity pattern PHD of horizontally polarized waves and final directivity patterns PD, each measured at these three types of frequencies under the diversity control.

Furthermore, Part (a), Part (b) and Part (c) of FIG. 18 show directivity patterns PV of vertically polarized waves and directivity patterns PH of horizontally polarized waves, each measured at the frequency of 5725 MHz, 5785 MHz and 5840 MHz for the wireless LAN antenna 701 on the right side of the note PC 700 shown in FIG. 14. And Part (d), Part (e) and Part (f) show a directivity pattern PV of vertically polarized waves and a directivity pattern PH of horizontally polarized waves, each measured at these three types of frequencies for the wireless LAN antenna 701 on the left side of the note PC 700 shown in FIG. 14. Furthermore, Part (g), Part (h) and Part (i) of FIG. 17 show a directivity pattern PVD of vertically polarized waves, a directivity pattern PHD of horizontally polarized waves and final directivity patterns PD, each measured at these three types of frequencies under the diversity control.

Also in each diagram from FIG. 16 to FIG. 18, in the same manner as in FIG. 15, the directivity patterns PVD of vertically polarized waves under the diversity control almost overlap the final directivity patterns PD under the diversity control.

Next, in the note PC 700 in FIG. 14, directivity patterns have been measured in a state where the portion incorporating the wireless LAN antenna 701 is wrapped in a third experimental cover having a shape equivalent to the first experimental cover shown in FIG. 5.

Figure 19:
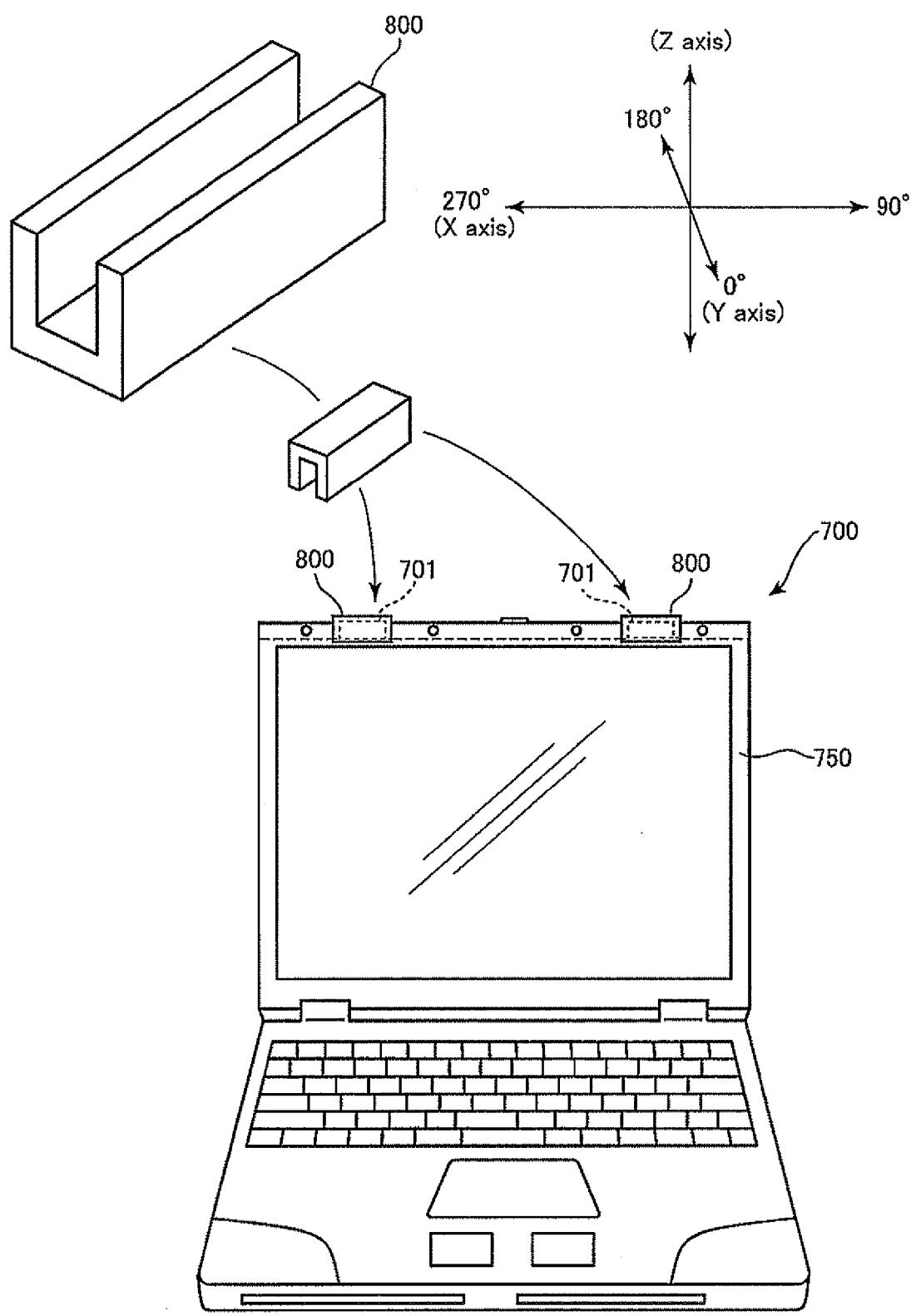
FIG. 19 is a diagram showing a state where the third experimental cover has been attached to the note PC 700 in FIG. 14.

FIG. 19 is a diagram showing a state where the third experimental cover has been attached to the note PC 700 in FIG. 14.

A third experimental cover 800 shown in this FIG. 19 is a dielectric material having the thickness of 2.5 mm formed in the shape of U, and, as shown in FIG. 19, it is put on each of the two positions where the wireless LAN antenna 701 is incorporated in the top section 750 of the note PC 700. In this experiment, directivity patterns have been measured in this state.

Figure 20:
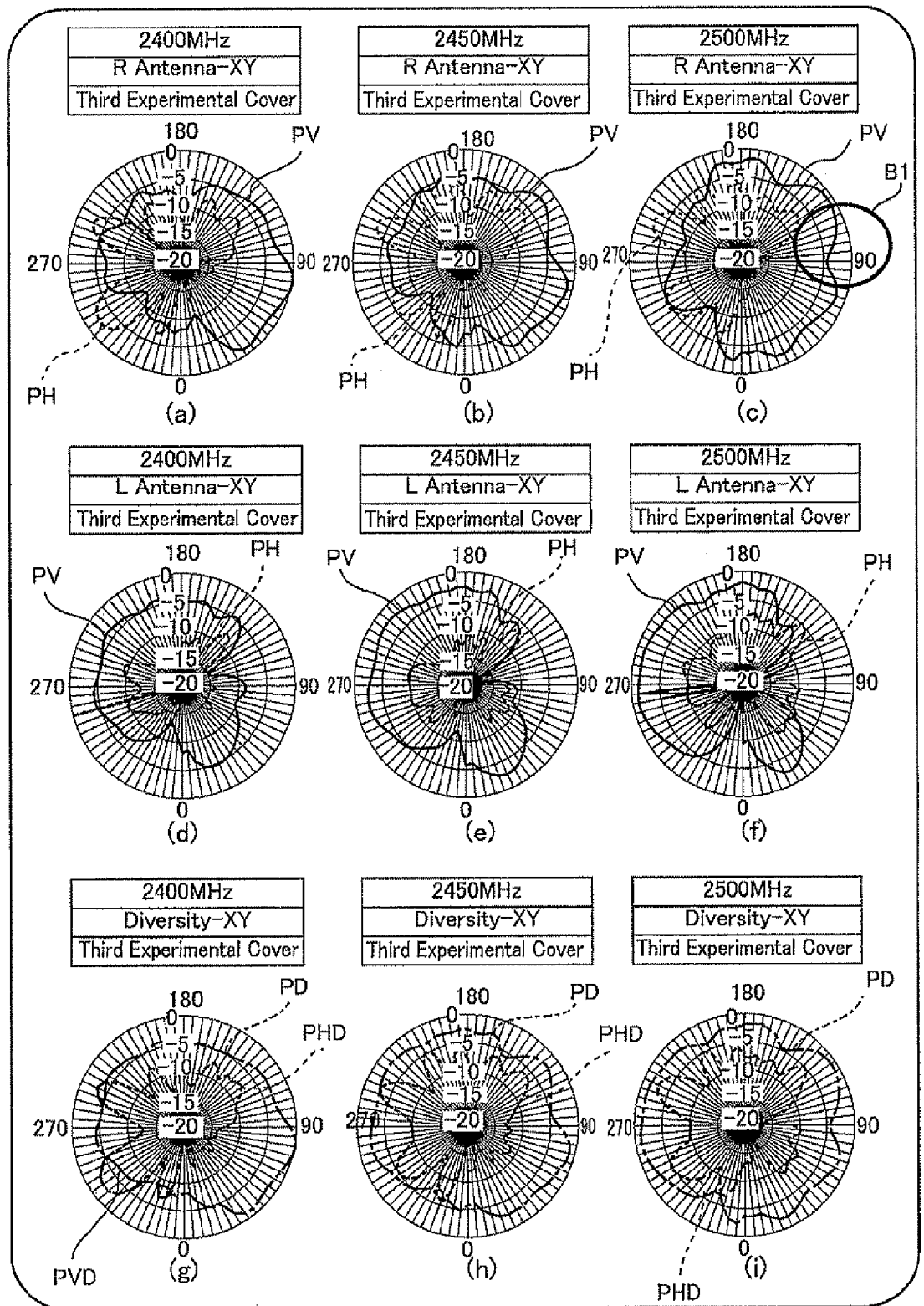
FIG. 20 shows directivity patterns measured for three types of frequencies from 2400 MHz to 2500 MHz in the note PC 700 shown in FIG. 19.
Figure 21:
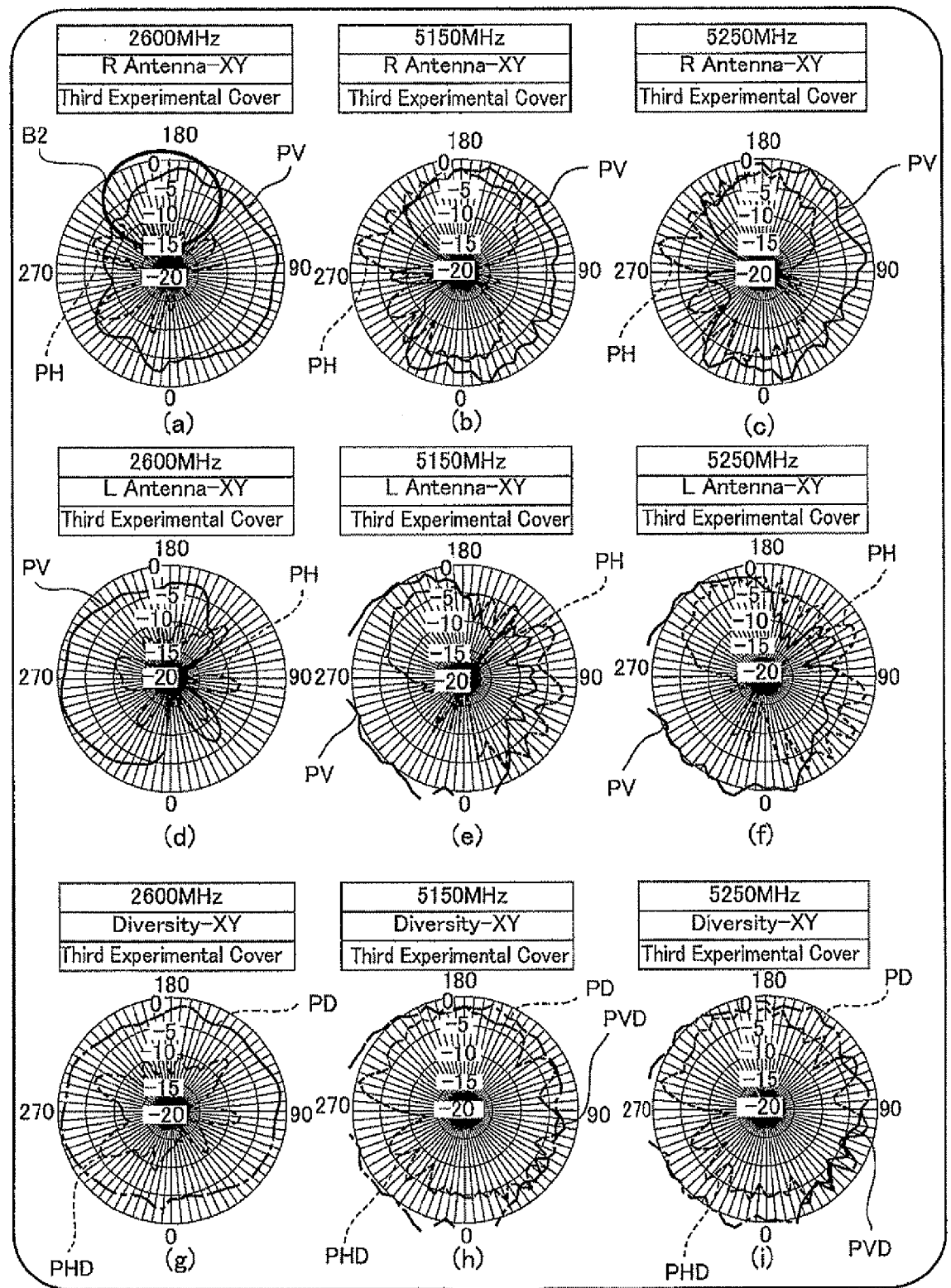
FIG. 21 shows directivity patterns measured for three types of frequencies from 2600 MHz to 5250 MHz in the note PC 700 in the state shown in FIG. 19.
Figure 22:
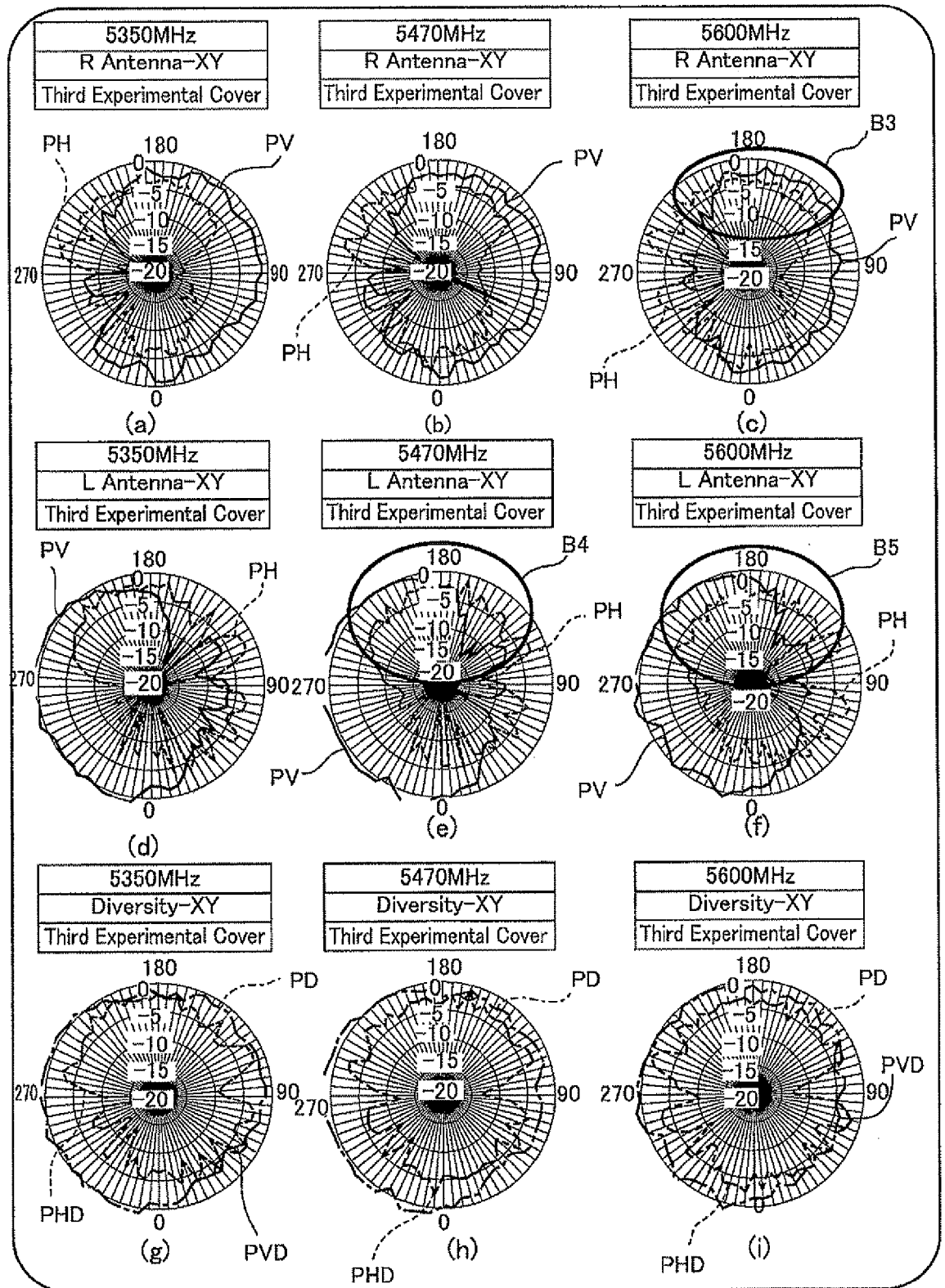
FIG. 22 shows directivity patterns measured for three types of frequencies from 5350 MHz to 5600 MHz in the note PC 700 in the state shown in FIG. 19.
Figure 23:
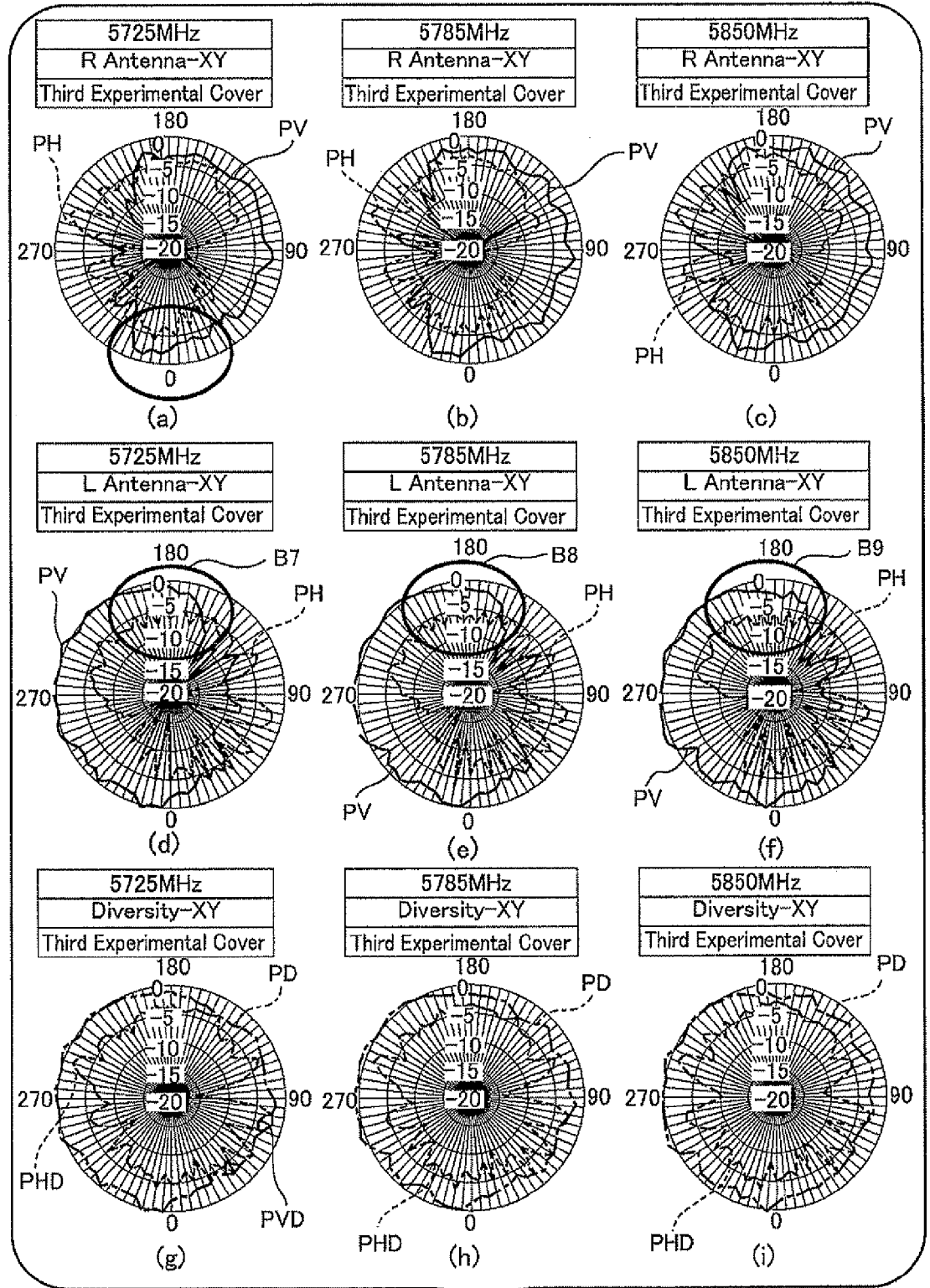
FIG. 23 shows directivity patterns measured for three types of frequencies from 5725 MHz to 5850 MHz in the note PC 700 in the state shown in FIG. 19.

FIG. 20 shows directivity patterns measured for three types of frequencies from 2400 MHz to 2500 MHz in the note PC 700 shown in FIG. 19. FIG. 21 shows directivity patterns measured for three types of frequencies from 2600 MHz to 5250 MHz in this note PC 700. FIG. 22 shows directivity patterns measured for three types of frequencies from 5350 MHz to 5600 MHz in this note PC 700, and FIG. 23 shows directivity patterns measured for three types of frequencies from 5725 MHz to 5850 MHz in this note PC 700.

Part (a), Part (b) and Part (c) of FIG. 20 show directivity patterns PV of vertically polarized waves and directivity patterns PH of horizontally polarized waves through the third experimental cover 800, each measured at the frequency of 2400 MHz, 2450 MHz and 2500 MHz respectively for the wireless LAN antenna 701 on the right side of the note PC 700 shown in FIG. 19. And Part (d), Part (e) and Part (f) show directivity patterns PV of vertically polarized waves and directivity patterns PH of horizontally polarized waves through the third experimental cover 800, each measured for these three types of frequencies for the wireless LAN antenna 701 on the left side of the note PC 700 shown in FIG. 19. Part (g), Part (h) and Part (i) show directivity patterns PVD of vertically polarized waves, directivity patterns PHD of horizontally polarized waves and final directivity patterns PD, each measured for these three types of frequencies under the diversity control.

Moreover, Part (a), Part (b) and Part (c) of FIG. 21 show directivity patterns PV of vertically polarized waves and directivity patterns PH of horizontally polarized waves through the third experimental cover 800, each measured at the frequency of 2600 MHz, 5150 MHz and 5250 MHz for the wireless LAN antenna 701 on the right side of the note PC 700 shown in FIG. 19. Part (d), Part (e) and Part (f) show directivity patterns PV of vertically polarized waves and directivity patterns PH of horizontally polarized waves through the third experimental cover 800, each measured for these three types of frequencies respectively for the wireless LAN antenna 701 on the left side of the note PC 700 shown in FIG. 19. Part (g), Part (h) and Part (i) show directivity patterns PVD of vertically polarized waves, directivity patterns PHD of horizontally polarized waves and final directivity patterns PD, each measured for these three types of frequencies under the diversity control.

Further, Part (a), Part (b) and Part (c) of FIG. 22 show directivity patterns PV of vertically polarized waves and directivity patterns PH of horizontally polarized waves through the third experimental cover 800, each measured at the frequency of 5350 MHz, 5470 MHz and 5600 MHz respectively for the wireless LAN antenna 701 on the right side of the note PC 700 shown in FIG. 19. And Part (d), Part (e) and Part (f) show directivity patterns PV of vertically polarized waves and directivity patterns PH of horizontally polarized waves through the third experimental cover 800, each measured for these three types of frequencies for the wireless LAN antenna 701 on the left side of the note PC 700 shown in FIG. 19. And Part (g), Part (h) and Part (i) show directivity patterns PVD of vertically polarized waves, directivity patterns PHD of horizontally polarized waves and final directivity patterns PD, each measured for these three types of frequencies under the diversity control.

In addition, Part (a), Part (b) and Part (c) of FIG. 23 show directivity patterns PV of vertically polarized waves and directivity patterns PH of horizontally polarized waves through the third experimental cover 800, each measured at the frequency of 5725 MHz, 5785 MHz and 5850 MHz respectively for the wireless LAN antenna 701 on the right side of the note PC 700 shown in FIG. 19. Part (d), Part (e) and Part (f) show directivity patterns PV of vertically polarized waves and directivity patterns PH of horizontally polarized waves through the third experimental cover 800, each measured for these three types of frequencies for the wireless LAN antenna 701 on the left side of the note PC 700 shown in FIG. 19. Part (g), Part (h) and Part (i) show directivity pattern PVD of vertically polarized waves, directivity patterns PHD of horizontally polarized waves and final directivity patterns PD, each measured for these three types of frequencies under the diversity control.

When each of the directivity patterns through the third experimental cover 800 shown in FIGS. 20 to 23 is compared with each of the directivity patterns without a cover shown in FIGS. 15 to 18, the shape of each directivity pattern with a cover differs in many places from the shape of each directivity pattern without a cover.

For instance, as to the shape of the directivity pattern PV of vertically polarized waves in Part (C) of FIG. 20, its pattern within the area surrounded by the circle B1 is dented compared with the pattern in the same area in Part (C) of FIG. 15, and instead, the pattern bulges in zero-degree direction and 180-degree direction, and as a whole it becomes closer to a semicircular convex in 90-degree direction. Furthermore, as to the shape of the directivity pattern PV of vertically polarized waves in Part (a) of FIG. 21, its pattern within the area surrounded by the circle B2 bulges compared with the pattern in the same area in Part (a) of FIG. 16, and the pattern bulges in zero-degree direction and 180-degree direction, and as a whole it becomes closer to a semicircular convex in 90-degree direction. Similarly, differences of the shape of each directivity pattern when there is no cover can be found in the shape of each pattern surrounded by each circle B3, B4, B5 in Part (c), Part (e), Part (f) of FIG. 22, and also in the shape of each pattern surrounded by each circle B3, B4, B5, B7, B8, B9 in Part (a), Part (d), Part (e), Part (f) of FIG. 23, respectively.

These differences are considered to be caused by the fact that radio waves passing through the cover are diffused by the third experimental cover 800, and the pattern shape of the wireless LAN antenna 701 on the right side becomes closer to a semicircular convex as a whole in the direction of 90-degree, whereas the pattern shape of the wireless LAN antenna 701 on the left side becomes closer to a semicircular convex as a whole in the direction of 270-degree. As a result of this, the final directivity pattern under the diversity control becomes closer to a circular shape as a whole.

Next, directivity patterns have been measured in a state where a fourth experimental cover having sawtooth convexo-concave is put on each of the two positions where the wireless LAN antenna 701 is incorporated, in the top section 750 of the note PC 700.

Figure 24:
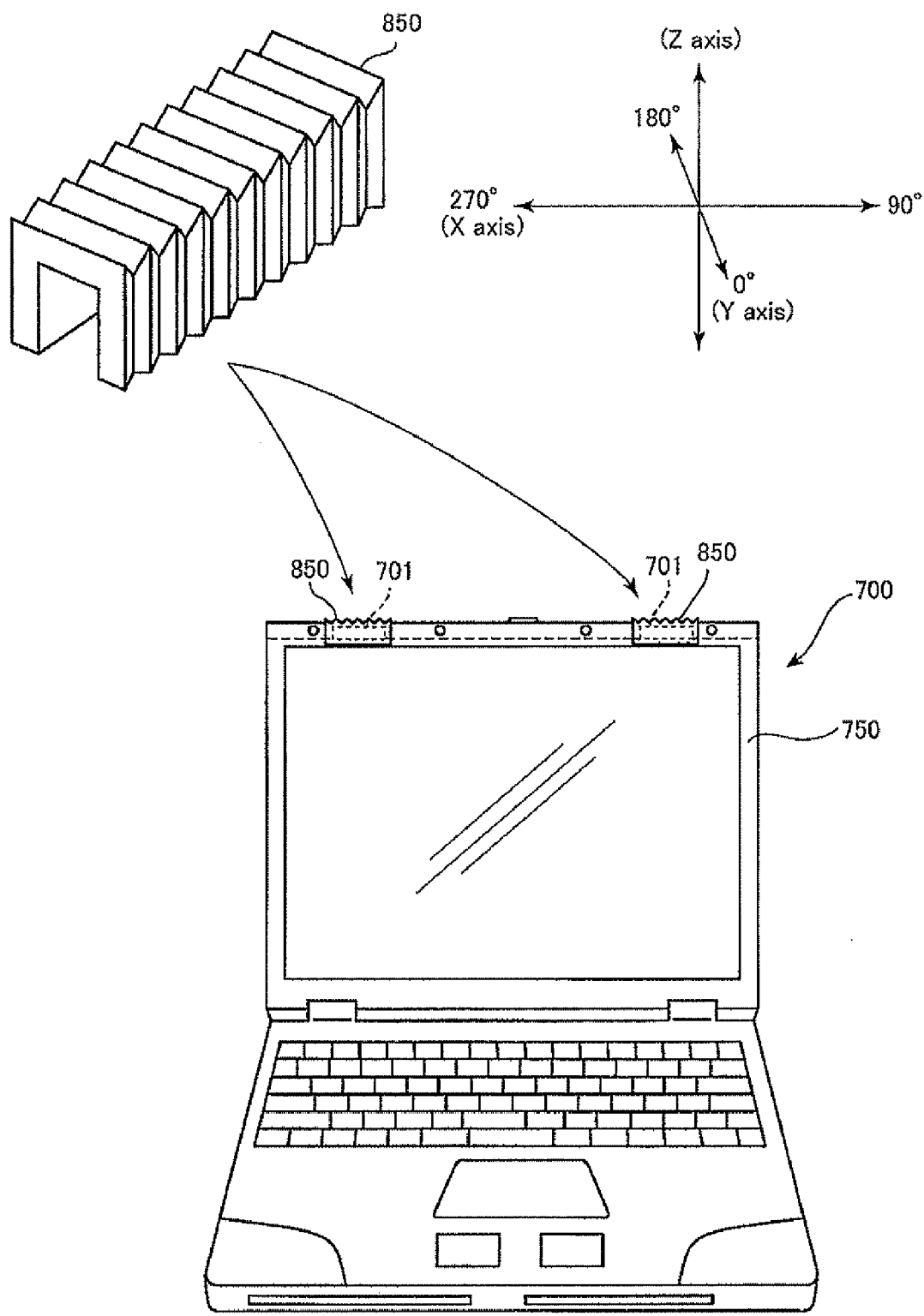
FIG. 24 is a diagram showing a state where a fourth experimental cover has been attached to the note PC 700 in FIG. 14.

FIG. 24 is a diagram showing a state where the fourth experimental cover has been attached to the note PC 700 in FIG. 14.

A fourth experimental cover 850 shown in this FIG. 24 is a dielectric material formed in the shape of U, which is further equipped with sawtooth convexo-concave on its outer wall. The sawtooth convexo-concave patterned on its outer wall of this fourth experimental cover 850 has the thickness of 2.5 mm at the top of crest and the thickness of 0.7 mm at the bottom of trough. In this experiment, this fourth experimental cover 850 is put on each of the two positions where the wireless LAN antenna 701 is incorporated, in the top section 750 of the note PC 700. In this experiment, directivity patterns are measured in this state.

Figure 25:
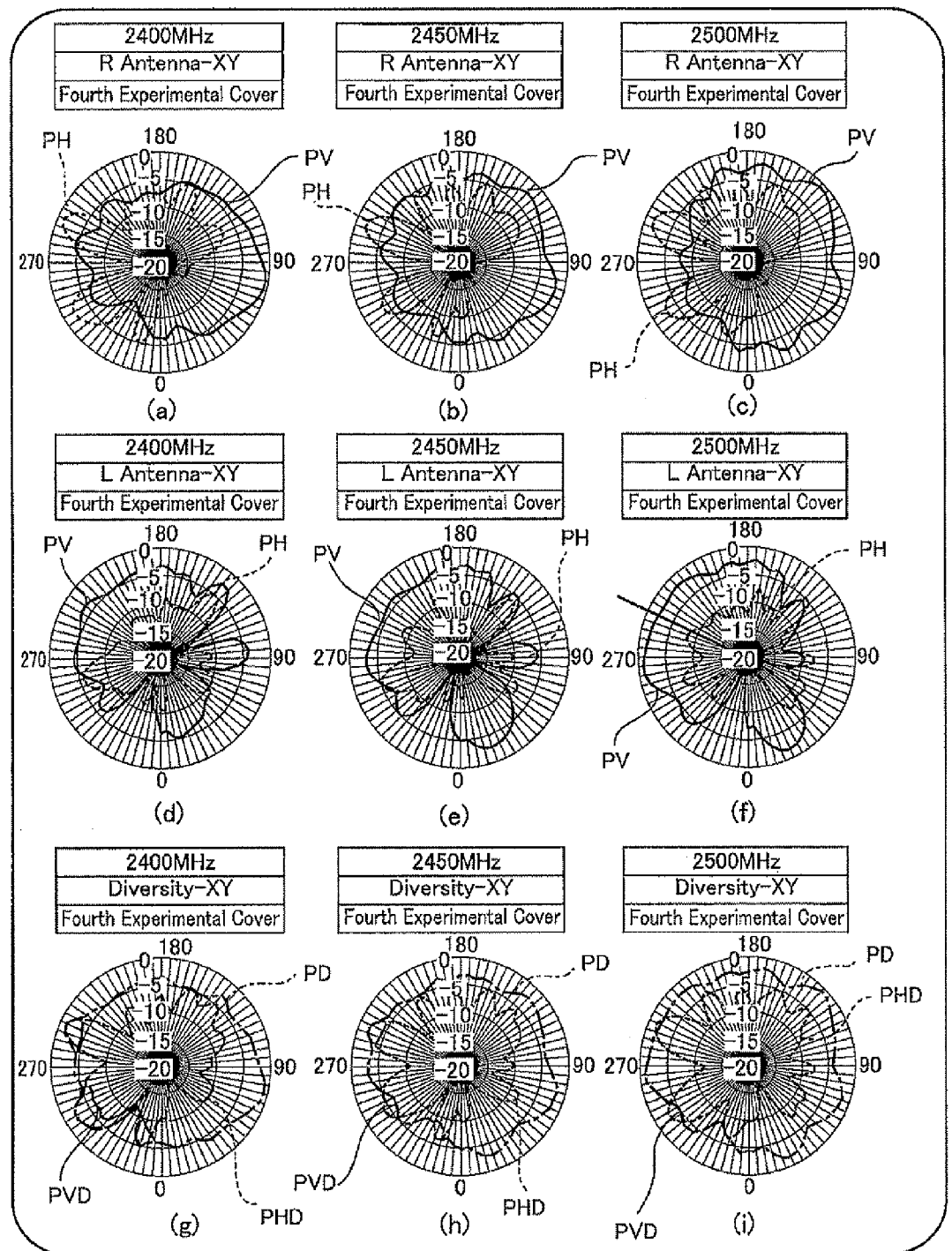
FIG. 25 shows directivity patterns measured for three types of frequencies from 2400 MHz to 2500 MHz in the note PC 700 in the state shown in FIG. 24.
Figure 26:
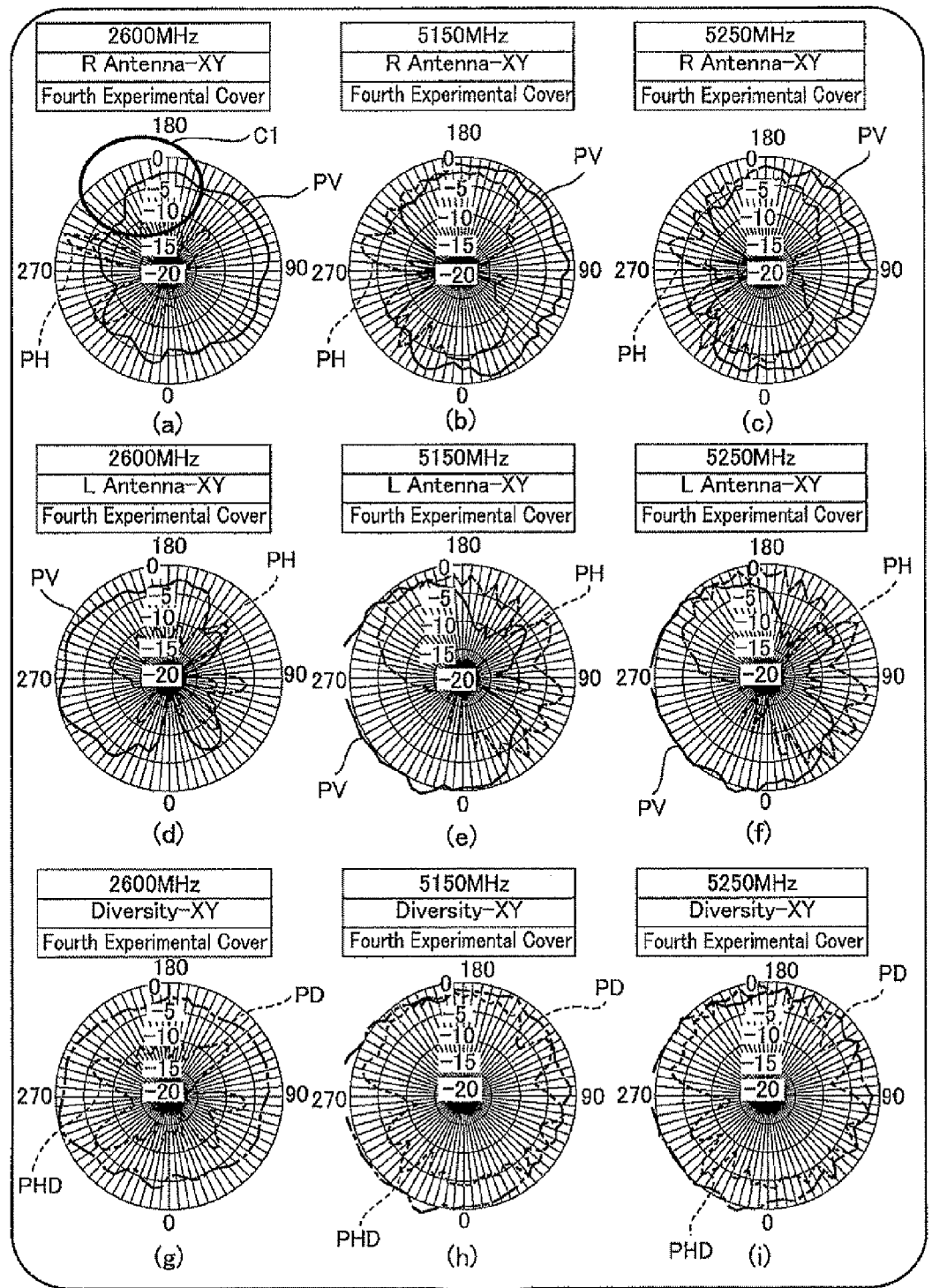
FIG. 26 shows directivity patterns measured for three types of frequencies from 2600 MHz to 5250 MHz in the note PC 700 in the state shown in FIG. 24.
Figure 27:
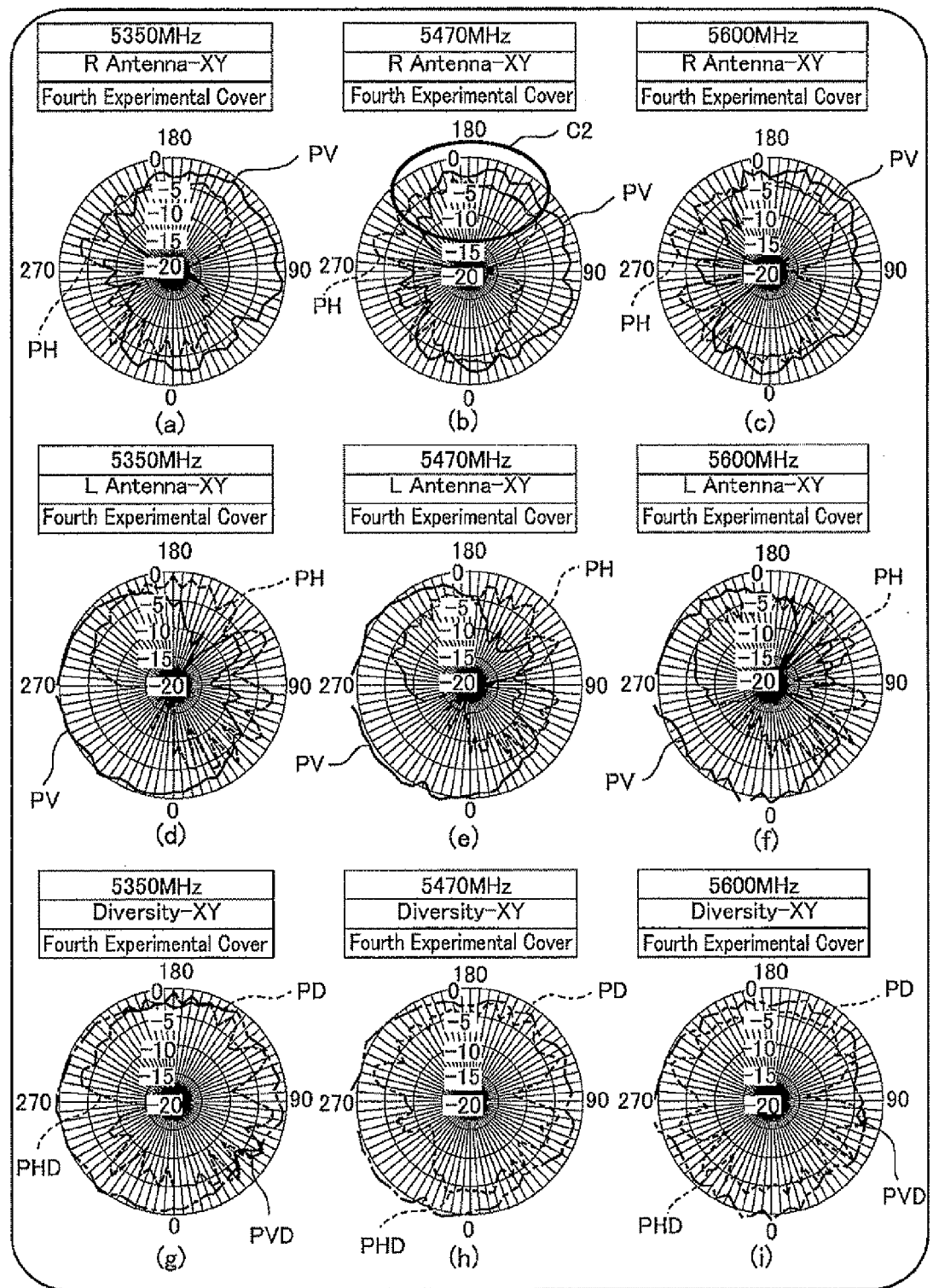
FIG. 27 shows directivity patterns measured for three types of frequencies from 5350 MHz to 5600 MHz in the note PC 700 in the state shown in FIG. 24.
Figure 28:
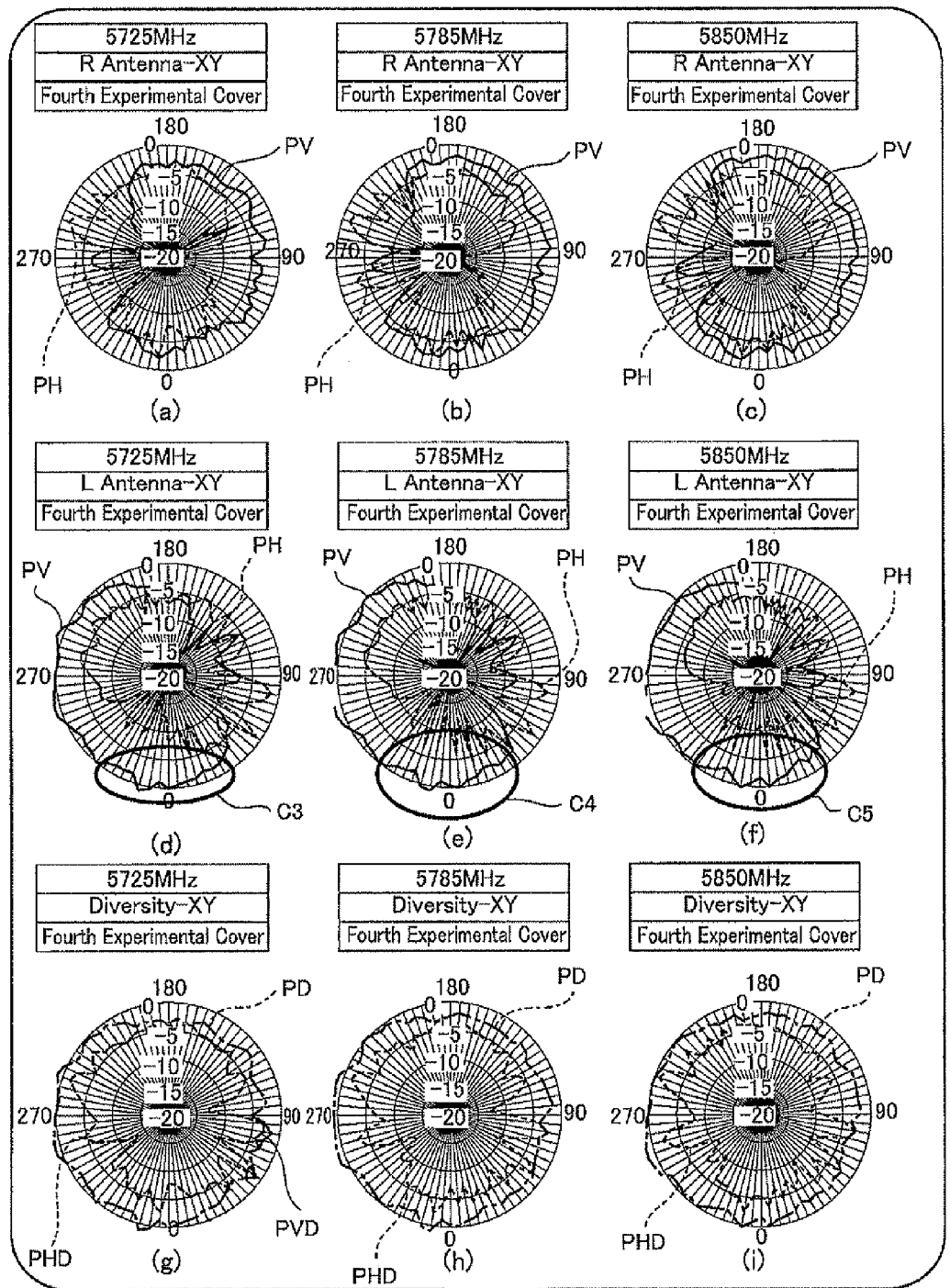
FIG. 28 shows directivity patterns measured for three types of frequencies from 5725 MHz to 5850 MHz in the note PC 700 in the state shown in FIG. 24.

FIG. 25 shows directivity patterns measured for three types of frequencies from 2400 MHz to 2500 MHz in the note PC 700 that is in the state shown in FIG. 24. FIG. 26 shows directivity patterns measured for three types of frequencies from 2600 MHz to 5250 MHz in this note PC 700. FIG. 27 shows directivity patterns measured for three types of frequencies from 5350 MHz to 5600 MHz in this note PC 700, and FIG. 28 shows directivity patterns measured for three types of frequencies from 5725 MHz to 5850 MHz in this note PC 700.

Part (a), Part (b) and Part (c) of FIG. 25 show directivity patterns PV of vertically polarized waves and directivity patterns PH of horizontally polarized waves through the fourth experimental cover 850, each measured at the frequency of 2400 MHz, 2450 MHz and 2500 MHz respectively for the wireless LAN antenna 701 on the right side of the note PC 700 shown in FIG. 24. Part (d), Part (e) and Part (f) show directivity patterns PV of vertically polarized waves and directivity patterns PH of horizontally polarized waves through the fourth experimental cover 850, each measured for these three types of frequencies for the wireless LAN antenna 701 on the left side of the note PC 700 shown in FIG. 24. Part (g), Part (h) and Part (i) show directivity patterns PVD of vertically polarized waves, directivity patterns PHD of horizontally polarized waves and final directivity patterns PD, each measured for these three types of frequencies under the diversity control.

Moreover, Part (a), Part (b) and Part (c) of FIG. 26 show directivity patterns PV of vertically polarized waves and directivity patterns PH of horizontally polarized waves through the fourth experimental cover 850, each measured at the frequency of 2600 MHz, 5150 MHz and 5250 MHz for the wireless LAN antenna 701 on the right side of the note PC 700 shown in FIG. 24. Part (d), Part (e) and Part (f) show directivity patterns PV of vertically polarized waves and directivity patterns PH of horizontally polarized waves through the fourth experimental cover 850, each measured for these three types of frequencies for the wireless LAN antenna 701 on the left side of the note PC 700 shown in FIG. 24. Part (g), Part (h) and Part (i) show a directivity pattern PVD of vertically polarized waves, a directivity pattern PHD of horizontally polarized waves and final directivity patterns PD, each measured for these three types of frequencies under the diversity control.

Also, Part (a), Part (b) and Part (c) of FIG. 27 show directivity patterns PV of vertically polarized waves and directivity patterns PH of horizontally polarized waves through the fourth experimental cover 850, each measured at the frequency of 5350 MHz, 5470 MHz and 5600 MHz respectively for the wireless LAN antenna 701 on the right side of the note PC 700 shown in FIG. 24. Part (d), Part (e) and Part (f) show directivity patterns PV of vertically polarized waves and directivity patterns PH of horizontally polarized waves through the fourth experimental cover 850, each measured for these three types of frequencies for the wireless LAN antenna 701 on the left side of the note PC 700 shown in FIG. 24. Part (g), Part (h) and Part (i) show directivity pattern PVD of vertically polarized waves, directivity patterns PHD of horizontally polarized waves and final directivity patterns PD, each measured for these three types of frequencies under the diversity control.

In addition, Part (a), Part (b) and Part (c) of FIG. 28 show directivity patterns PV of vertically polarized waves and directivity patterns PH of horizontally polarized waves through the third experimental cover 800, each measured at the frequency of 5725 MHz, 5785 MHz and 5850 MHz for the wireless LAN antenna 701 on the right side of the note PC 700 shown in FIG. 24. Part (d), Part (e) and Part (f) show directivity patterns PV of vertically polarized waves and directivity patterns PH of horizontally polarized waves through the third experimental cover 800, each measured for these three types of frequencies for the wireless LAN antenna 701 on the left side of the note PC 700 shown in FIG. 24. Part (g), Part (h) and Part (i) show directivity patterns PVD of vertically polarized waves, directivity patterns PHD of horizontally polarized waves and final directivity patterns PD, each measured for these three types of frequencies under the diversity control.

When each of the directivity patterns through the fourth experimental cover 850 shown in FIGS. 25 to 28 is compared with each of the directivity patterns without a cover shown in FIGS. 15 to 18, the shape of each directivity pattern with the cover differs in many places from the shape of each directivity pattern without a cover.

For instance, as to the shape of the directivity pattern PV of vertically polarized waves in Part (C) of FIG. 26, its pattern within the area surrounded by the circle C1 bulges compared with the pattern in the same area in Part (C) of FIG. 16, and instead, its pattern is dented in 90 direction and as a whole it comes closer to a semicircular convex in 90-degree direction. Similarly, differences can be found in the shape of pattern surrounded by circle C2 in Part (b) of FIG. 27 and by each circle C3, C4, C5 in Part (d), Part (e), Part (f) of FIG. 28, which are different from the shape of each directivity without a cover. Further, these differences are in many cases larger than the difference of each directivity pattern through the third experimental cover 800 shown in FIG. 20 to FIG. 23 from each directivity pattern without a cover. It can be considered that this is because the effect of diffusing radio waves is enhanced by the sawtooth convexo-concave which the fourth experimental cover has. Consequently, in each directivity pattern through this fourth experimental cover 850, its pattern shape for the wireless LAN antenna 701 becomes much closer to a semicircle than each directivity pattern through the third experimental cover 800, and the final directivity pattern under the diversity control becomes closer to a circle.

Next, directivity patterns have been measured in a state where a fifth experimental cover on which sawtooth convexo-concave is patterned in a position that is different from the fourth experimental cover is put on each of the two positions where the wireless LAN antenna 701 is incorporated, in the top section 750 of the note PC 700.

Figure 29:
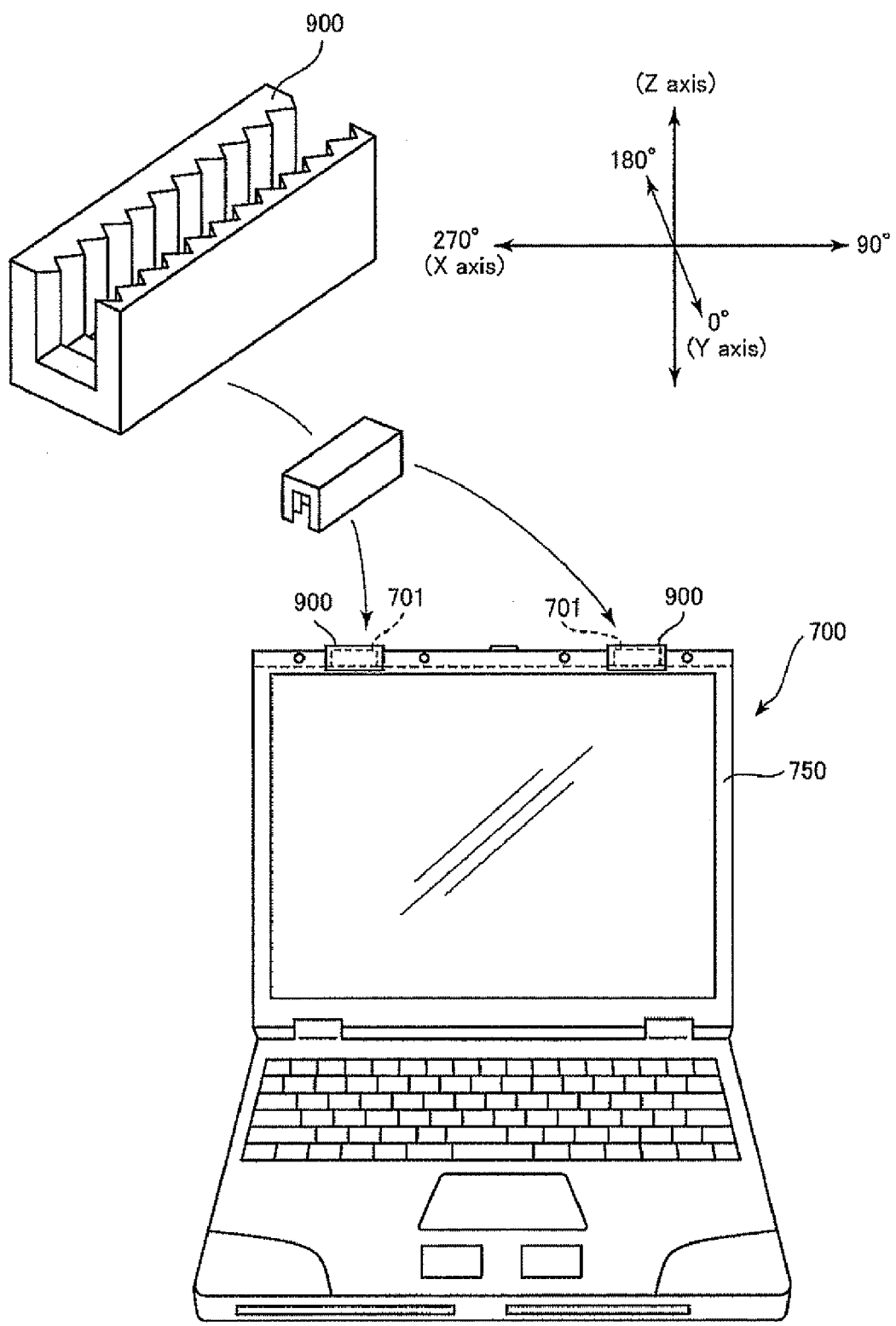
FIG. 29 is a diagram showing a state where a fifth experimental cover has been attached to the note PC 700 in FIG. 14.

FIG. 29 is a diagram showing a state where the fifth experimental cover has been attached to the note PC 700 in FIG. 14.

A fifth experimental cover 900 shown in this FIG. 29 is a dielectric material formed in the shape of U, which is further equipped with sawtooth convexo-concave on its inner wall. The sawtooth convexo-concave patterned on the inner wall of this fifth experimental cover 900 has the thickness of 2.5 mm at the top of crest and the thickness of 0.7 mm at the bottom of trough. In this experiment, this fifth experimental cover 900 is put on each of the two positions where the wireless LAN antenna 701 is incorporated, in the top section 750 of the note PC 700. In this experiment, directivity patterns are measured in this state.

Figure 30:
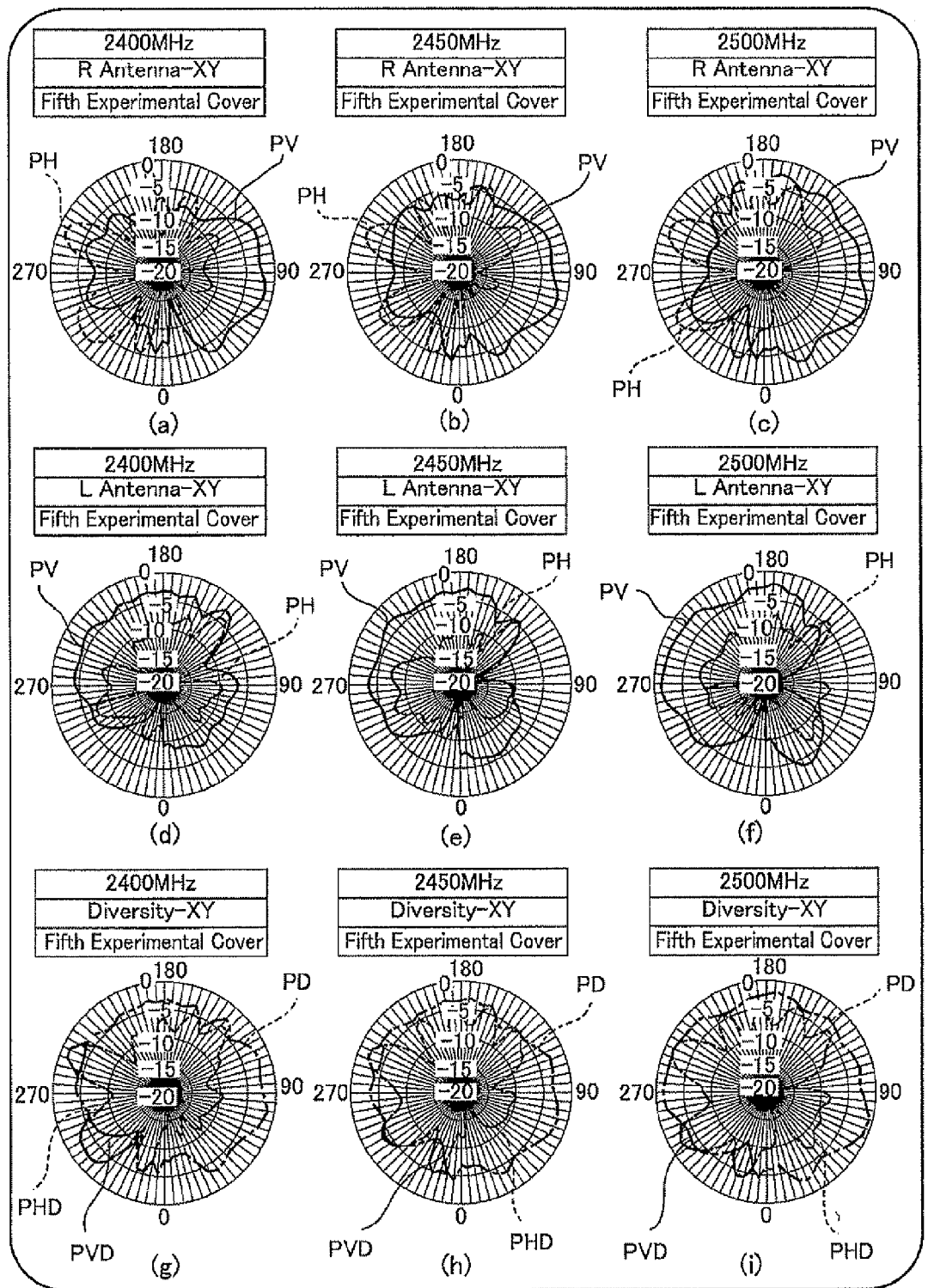
FIG. 30 shows directivity patterns measured for three types of frequencies from 2400 MHz to 2500 MHz in the note PC 700 in the state shown in FIG. 29.
Figure 31:
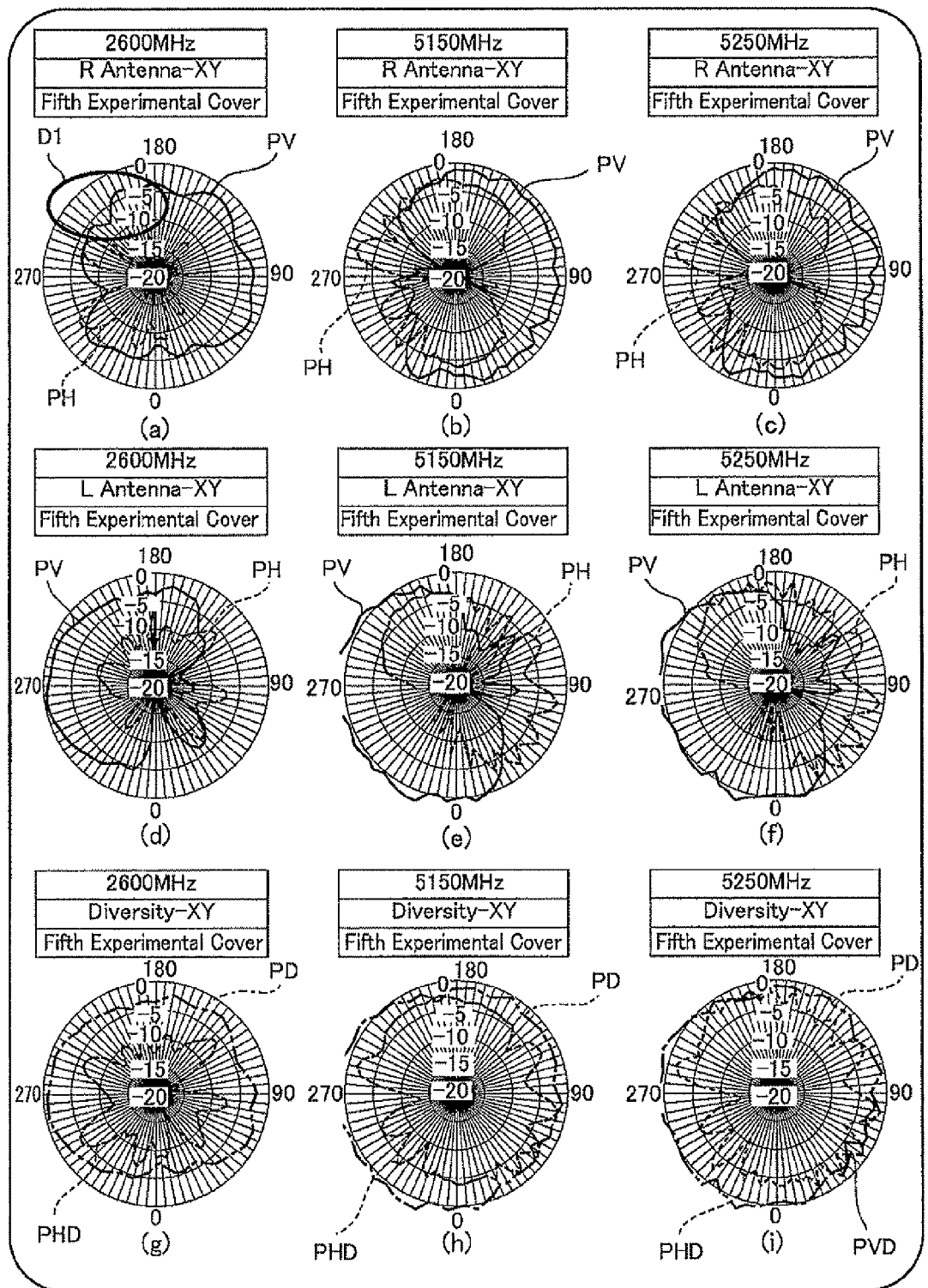
FIG. 31 shows directivity patterns measured for three types of frequencies from 2600 MHz to 5250 MHz in the note PC 700 in the state shown in FIG. 29.
Figure 32:
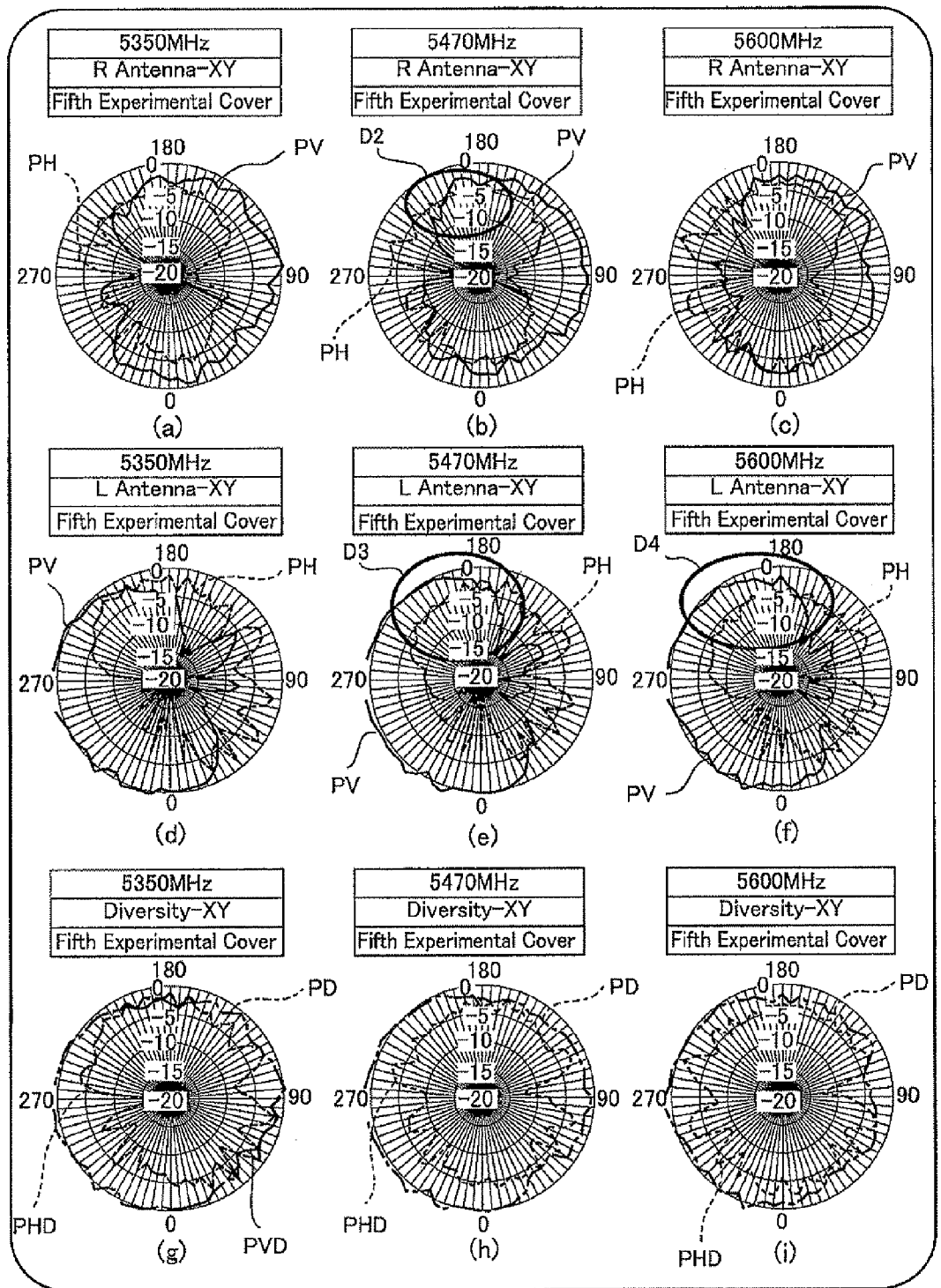
FIG. 32 shows directivity patterns measured for three types of frequencies from 5350 MHz to 5600 MHz in the note PC 700 in the state shown in FIG. 29.
Figure 33:
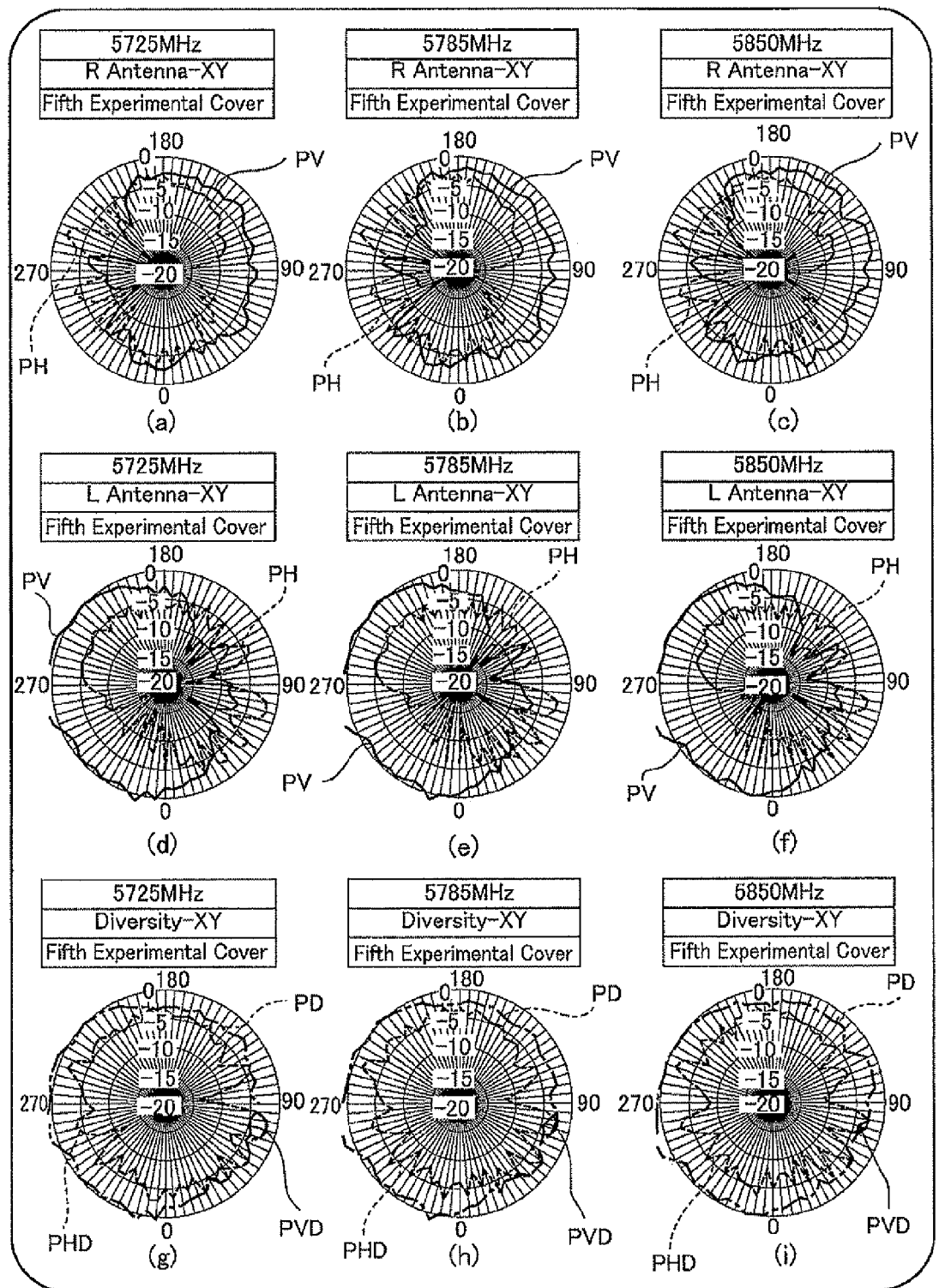
FIG. 33 shows directivity patterns measured for three types of frequencies from 5725 MHz to 5850 MHz in the note PC 700 in the state shown in FIG. 29.

FIG. 30 shows directivity patterns measured for three types of frequencies from 2400 MHz to 2500 MHz in the note PC 700 shown in FIG. 29. FIG. 31 shows directivity patterns measured for three types of frequencies from 2600 MHz to 5250 MHz in this note PC 700. FIG. 32 shows directivity patterns measured for three types of frequencies from 5350 MHz to 5600 MHz in this note PC 700, and FIG. 33 shows directivity patterns measured for three types of frequencies from 5725 MHz to 5850 MHz in this note PC 700.

Part (a), Part (b) and Part (c) of FIG. 30 show directivity patterns PV of vertically polarized waves and directivity patterns PH of horizontally polarized waves through the fifth experimental cover 900, each measured at the frequency of 2400 MHz, 2450 MHz and 2500 MHz respectively for the wireless LAN antenna 701 on the right side of the note PC 700 shown in FIG. 29. Part (d), Part (e) and Part (f) show directivity patterns PV of vertically polarized waves and directivity patterns PH of horizontally polarized waves through the fifth experimental cover 900, each measured for these three types of frequencies for the wireless LAN antenna 701 on the left side of the note PC 700 shown in FIG. 29. Part (g), Part (h) and Part (i) show directivity patterns PVD of vertically polarized waves, directivity patterns PHD of horizontally polarized waves and final directivity patterns PD, each measured for these three types of frequencies under the diversity control.

Moreover, Part (a), Part (b) and Part (c) of FIG. 31 show directivity patterns PV of vertically polarized waves and directivity patterns PH of horizontally polarized waves through the fifth experimental cover 900, each measured at the frequency of 2600 MHz, 5150 MHz and 5250 MHz respectively for the wireless LAN antenna 701 on the right side of the note PC 700 shown in FIG. 29. Part (d), Part (e) and Part (f) show directivity patterns PV of vertically polarized waves and directivity patterns PH of horizontally polarized waves through the fifth experimental cover 900, each measured for these three types of frequencies for the wireless LAN antenna 701 on the left side of the note PC 700 shown in FIG. 29. Part (g), Part (h) and Part (i) show directivity patterns PVD of vertically polarized waves, directivity patterns PHD of horizontally polarized waves and final directivity patterns PD, each measured for these three types of frequencies under the diversity control.

Also, Part (a), Part (b) and Part (c) of FIG. 32 show directivity patterns PV of vertically polarized waves and directivity patterns PH of horizontally polarized waves through the fifth experimental cover 900, each measured at the frequency of 5350 MHz, 5470 MHz and 5600 MHz respectively for the wireless LAN antenna 701 on the right side of the note PC 700 shown in FIG. 29. Part (d), Part (e) and Part (f) show directivity patterns PV of vertically polarized waves and directivity patterns PH of horizontally polarized waves through the fifth experimental cover 900, each measured for these three types of frequencies for the wireless LAN antenna 701 on the left side of the note PC 700 shown in FIG. 29. Part (g), Part (h) and Part (i) show directivity patterns PVD of vertically polarized waves, directivity patterns PHD of horizontally polarized waves and final directivity patterns PD, each measured for these three types of frequencies under the diversity control.

In addition, Part (a), Part (b) and Part (c) of FIG. 33 show directivity patterns PV of vertically polarized waves and directivity patterns PH of horizontally polarized waves through the third experimental cover 800, each measured at the frequency of 5725 MHz, 5785 MHz and 5850 MHz respectively for the wireless LAN antenna 701 on the right side of the note PC 700 shown in FIG. 29. Part (d), Part (e) and Part (f) show directivity patterns PV of vertically polarized waves and directivity patterns PH of horizontally polarized waves through the third experimental cover 800, each measured for these three types of frequencies for the wireless LAN antenna 701 on the left side of the note PC 700 shown in FIG. 29. Part (g), Part (h) and Part (i) show directivity patterns PVD of vertically polarized waves, directivity patterns PHD of horizontally polarized waves and final directivity patterns PD, each measured for these three types of frequencies under the diversity control.

When each directivity pattern through the fifth experimental cover 900 shown in FIGS. 30 to 33 is compared with each directivity pattern when there is no cover shown in FIGS. 15 to 18, the shape of each directivity pattern through the cover differs in many places from the shape of each directivity pattern without a cover.

For instance, as to the shape of the directivity pattern PV of vertically polarized waves in Part (a) of FIG. 31, its pattern within the area surrounded by the circle D1 bulges compared with the pattern in the same area in Part (a) of FIG. 16, and instead, the pattern is dented in 90-degree direction and as a whole it becomes closer to a semicircular convex in 90-degree direction. Similarly, differences of the shape of each directivity pattern when there is no cover can be found in the shape of each pattern surrounded by each circle D2, D3, D4 in Part (b), Part (e), Part (f) of FIG. 32, respectively. Further, these differences are in many cases larger than the difference of each directivity pattern through the third experimental cover 800 shown in FIG. 20 to FIG. 23 from each directivity pattern without a cover. It can be considered that this is because the diffusion effect toward radio waves is enhanced by the sawtooth convexo-concave which the fifth experimental cover 900 has, similarly to the fourth experimental cover 850 in FIG. 24. Consequently, in each directivity pattern through this fifth experimental cover 900, it can be considered that its pattern shape for the wireless LAN antenna 701 becomes much closer to a semicircle than each directivity pattern through the third experimental cover 800, and the final directivity pattern under the diversity control becomes closer to a circle.

Up to this, by the experiment described with reference to FIG. 14 to FIG. 33, it has been found that the sawtooth convexo-concave patterned on the antenna cover has the diffusion effect toward radio waves. In the example of FIG. 13, such a sawtooth convexo-concave 601b_1 is patterned on the ceiling 601b of the cover 601. With this sawtooth convexo-concave 601b_1, radio waves heading for the ceiling 601b are diffused, which makes directivity stronger in the horizontal direction than in the vertical direction and thus a desirable directivity pattern can be obtained.

So far, descriptions have been made about the examples such as the double layer structure of a dielectric material, the increase of thickness and further, the sawtooth convexo-concave, which can have the diffusion effect toward radio waves. However, the present invention is not limited to this. For instance, a square pyramid convexo-concave to be described hereinafter can be considered as another example for exercising the diffusion effect.

Figure 34:
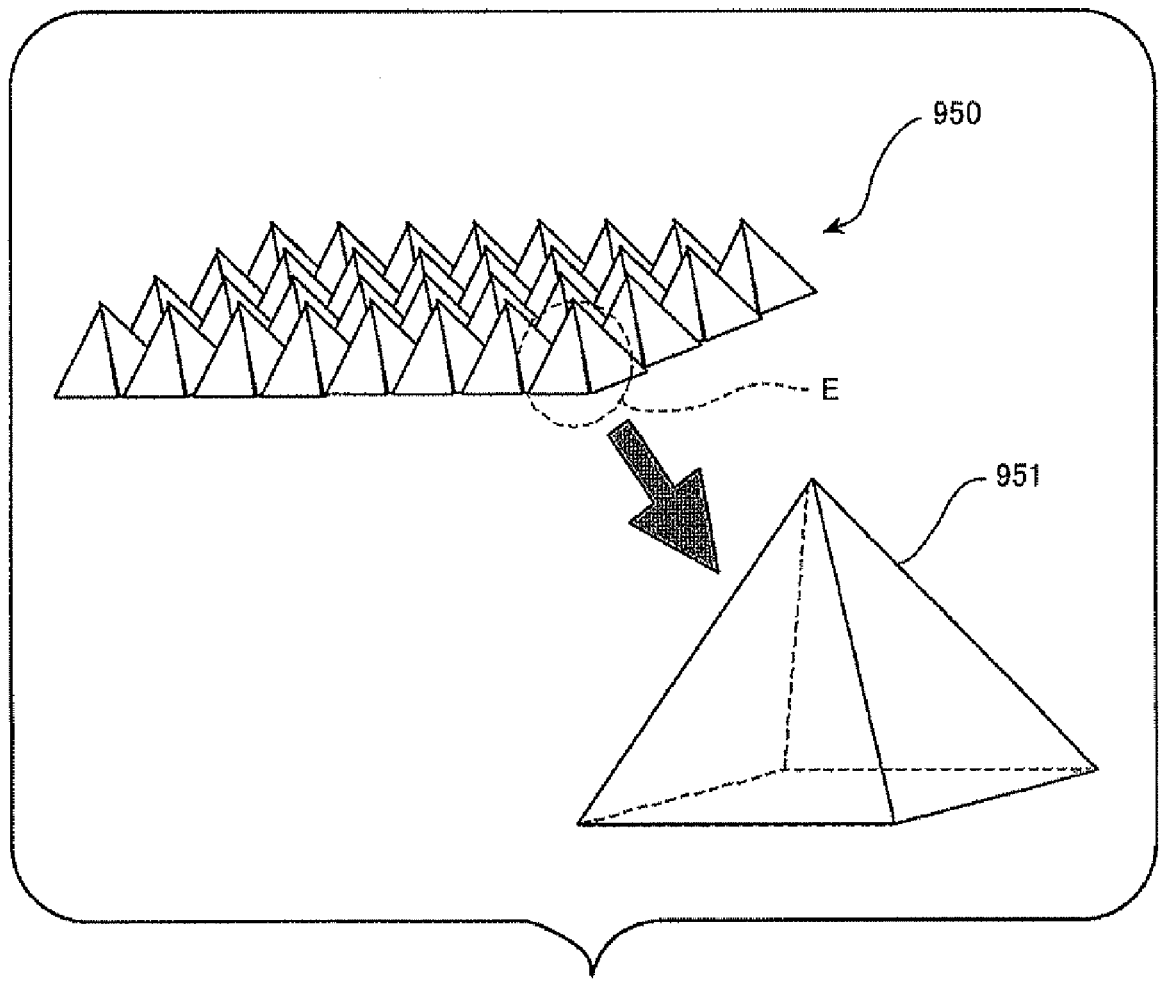
FIG. 34 is a diagram showing one example of square pyramid convexo-concave.

FIG. 34 is a diagram showing one example of a square pyramid convexo-concave.

In this FIG. 34, a square pyramid convexo-concave 950 that is constituted of multiple square pyramids arranged on a plane is shown, and one square pyramid 951 in the area E enclosed in a dotted circle is shown as an example representing the square pyramid constituting the convexo-concave. The square pyramid convexo-concave 950 shown in this FIG. 34 corresponds to one example of the square pyramid convexo-concave according to the present invention.

The square pyramid convexo-concave 950 has the effect of diffusing radio waves passing through this square pyramid convexo-concave 950 by reflection, refraction and diffraction or the like in the same manner as the sawtooth convexo-concave has. And, for example, by disposing the square pyramid convexo-concave 950 on the ceiling of the cover that wraps the antenna, radio waves heading for the ceiling are diffused and thereby directivity can be more enhanced in the horizontal direction than in the vertical direction, in the same manner as the example in FIG. 13, and thus a desirable directivity pattern in the wireless LAN can be obtained.

In the above description, the note PC 100 incorporated into wireless LAN has been exemplified as one embodiment of the electronic device according to the present invention. However, the present invention is not limited to this, and an electronic device according to the present invention may be, for example, a general personal computer incorporated into wireless LAN, or may be some household electric appliances or the like that conducts wireless communication with an external device.

Furthermore, in the above description, as one example of the antenna main body according to the present invention, the wireless LAN antenna 181 obtained by integral forming of a metal plate as shown in FIG. 3 has been exemplified. However, no specific limit is placed on the material, shape and usage purpose of the antenna main body according to the present invention, and the antenna main body may be a general antenna or the like mounted in a portable device.

What is claimed is:

1. An antenna device mounted in an electronic device and used for radio wave communication between the electronic device and the external of the electronic device, the antenna device comprising:
   an antenna main body; and
   an antenna cover that is formed of a dielectric material, has a first wall, a second wall and a ceiling for covering the antenna main body, and strengthens directivity of radio wave communication on sides of the first wall and the second wall of the antenna device by a structure of the ceiling, wherein
   the ceiling of the antenna cover is plate-shaped and connects between the first wall and the second wall in a fixed thickness thicker than the first wall and the second wall.

2. The antenna device according to claim 1, wherein the ceiling of the antenna cover is formed by stacking a plurality of ceiling boards.

3. The antenna device according to claim 1, wherein the electronic device is portable.

4. An electronic device, comprising:
   an antenna device used for radio wave communication, equipped with an antenna main body and an antenna cover that is formed of a dielectric material, has a first wall, a second wall and a ceiling for covering the antenna main body, and strengthens directivity of radio wave communication on sides of the first wall and the second wall of the antenna device by a structure of the ceiling;

a processor that conducts information processing; and a communication section that transmits and receives information as an object of information processing by the processor, to and from the external through radio wave communication of the antenna device, wherein the ceiling of the antenna cover is plate-shaped and connects between the first wall and the second wall in a fixed thickness thicker than the first wall and the second wall.

5. The electronic device according to claim 4, wherein the ceiling of the antenna cover is formed by stacking a plurality of ceiling boards.

6. The electronic device according to claim 4, wherein the electronic device is portable.

7. The electronic device according to claim 4, wherein the electronic device is formed by a main body having a surface to mount the electronic device thereon and a top section that is connected to the main body so as to be openable and closable relative to the main body, and the top section incorporates the antenna device and the antenna cover.

8. An antenna cover applicable for an electronic device equipped with an antenna device used for radio wave communication, the antenna cover comprising:

two walls formed of a dielectric material; and a ceiling to both ends of which the two walls are connected respectively, wherein the antenna cover wraps an antenna main body of the antenna device with the two walls and the ceiling, and strengthens directivity of radio waves on the wall side of the antenna device by a structure of the ceiling, wherein the ceiling of the antenna cover is plate-shaped and connects between the two walls in a fixed thickness thicker than the two walls.

9. The antenna cover according to claim 8, wherein the ceiling of the antenna cover is formed by stacking a plurality of ceiling boards.

10. The antenna cover according to claim 8, wherein the electronic device is portable.

* * * * *